(12) United States Patent
Suzuki et al.

(10) Patent No.: US 11,938,396 B2
(45) Date of Patent: Mar. 26, 2024

(54) GAME SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

(71) Applicant: Nintendo Co., Ltd., Kyoto (JP)

(72) Inventors: Ryosuke Suzuki, Kyoto (JP); Hiroki Hamaue, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/897,241

(22) Filed: Aug. 29, 2022

(65) Prior Publication Data

US 2022/0409993 A1 Dec. 29, 2022

Related U.S. Application Data

(63) Continuation of application No. 17/204,949, filed on Mar. 18, 2021, now Pat. No. 11,465,043.

(30) Foreign Application Priority Data

Mar. 19, 2020 (JP) ................................ 2020-049055

(51) Int. Cl.
*A63F 13/245* (2014.01)
*A63F 13/211* (2014.01)
(Continued)

(52) U.S. Cl.
CPC .......... *A63F 13/245* (2014.09); *A63F 13/211* (2014.09); *A63F 13/218* (2014.09); *A63F 13/44* (2014.09); *A63F 13/814* (2014.09)

(58) Field of Classification Search
CPC .... A63F 13/245; A63F 13/211; A63F 13/218; A63F 13/44; A63F 13/814
See application file for complete search history.

(56) References Cited

U.S. PATENT DOCUMENTS

| 5,342,273 | A | * | 8/1994 | Plendl | A63B 21/045 482/122 |
| 2008/0146336 | A1 | * | 6/2008 | Feldman | A63F 13/24 463/37 |

(Continued)

FOREIGN PATENT DOCUMENTS

| JP | 2003-122487 A | 4/2003 |
| JP | 2019-129971 A | 8/2019 |
| JP | 2019-187564 A | 10/2019 |

OTHER PUBLICATIONS

Office Action dated Jan. 9, 2024 issued in Japanese Application No. 2020-049055 with English machine translation (12 pages).

(Continued)

*Primary Examiner* — Dmitry Suhol
*Assistant Examiner* — Carl V Larsen
(74) *Attorney, Agent, or Firm* — Nixon & Vanderhye P.C.

(57) ABSTRACT

An example of a game system includes an input apparatus, at least a part of which elastically deforms by applying a force to the input apparatus. During the execution of a rhythm game, music is reproduced, and at each of a plurality of timings associated with the music, a user input is evaluated. If the input apparatus deforms at a predetermined timing, a user input at the predetermined timing is evaluated in favor of a user regardless of whether or not the input apparatus deforms from a time before the predetermined timing.

16 Claims, 26 Drawing Sheets

(51) Int. Cl.
  *A63F 13/218* (2014.01)
  *A63F 13/44* (2014.01)
  *A63F 13/814* (2014.01)

(56) References Cited

U.S. PATENT DOCUMENTS

| | | | | |
|---|---|---|---|---|
| 2010/0004061 | A1* | 1/2010 | Merril | A63B 24/0087 |
| | | | | 463/36 |
| 2010/0087258 | A1* | 4/2010 | Moriwaki | A63F 13/45 |
| | | | | 463/43 |
| 2010/0210359 | A1* | 8/2010 | Krzeslo | A63F 13/213 |
| | | | | 463/31 |
| 2011/0132181 | A1* | 6/2011 | Kockovic | G10H 1/34 |
| | | | | 84/723 |
| 2011/0181703 | A1* | 7/2011 | Kobayashi | A63F 13/213 |
| | | | | 348/46 |
| 2013/0201115 | A1* | 8/2013 | Heubel | G06F 3/0488 |
| | | | | 345/173 |
| 2017/0216670 | A1* | 8/2017 | Kuroda | A63B 21/4035 |
| 2017/0300172 | A1* | 10/2017 | Donnelly | G06F 3/165 |
| 2019/0232175 | A1 | 8/2019 | Morishita et al. | |

OTHER PUBLICATIONS

Konami Official Books, "Operation at the time of attack", Pawapurokun Pocket12 Official Guide, First Edition, Konami Digital Entertainment Co., Ltd., Jul. 14, 2011 (5 pages).

* cited by examiner

FIG. 6
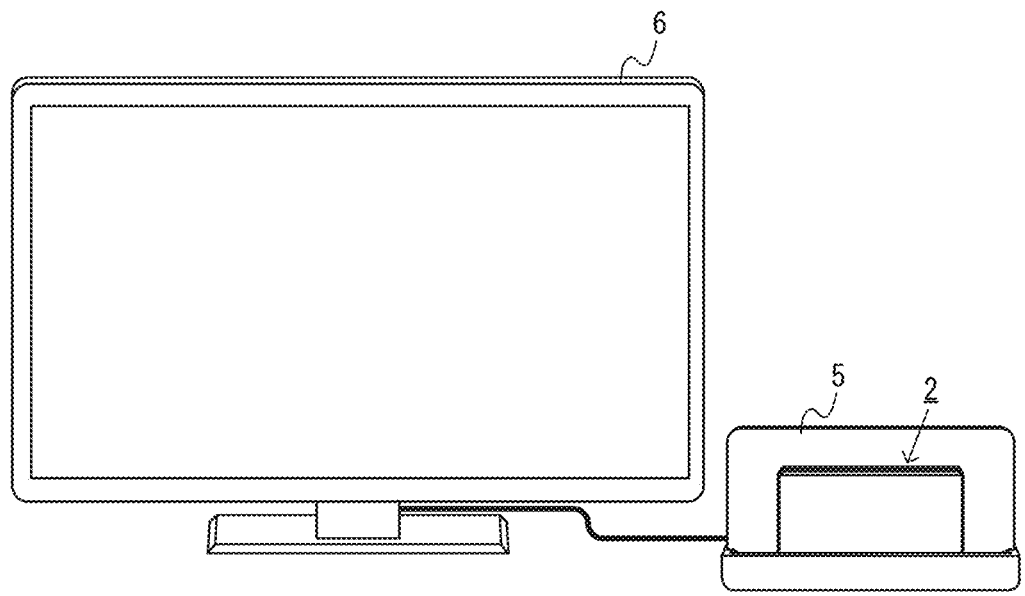
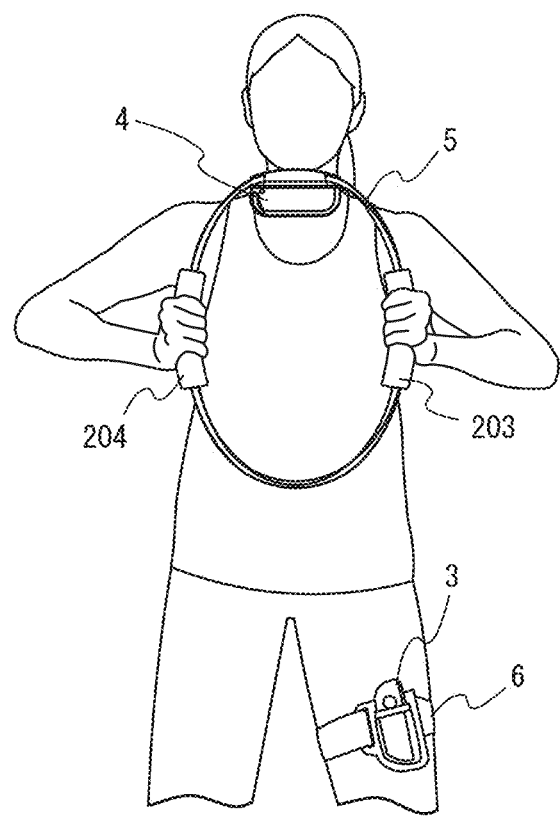

FIG. 12
INSTRUCTION SIGN
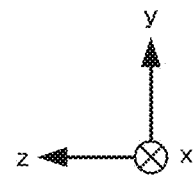
SCREEN
VIRTUAL CAMERA

GAME SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

CROSS-REFERENCE TO RELATED APPLICATIONS

This application is a continuation of U.S. application Ser. No. 17/204,949, filed Mar. 18, 2021, which claims priority to Japanese Patent Application No. 2020-049055 filed on Mar. 19, 2020, the entire contents of each are incorporated herein by reference.

FIELD

An exemplary embodiment relates to a game system, an information processing program, an information processing apparatus, and an information processing method that are capable of performing a rhythm game.

BACKGROUND AND SUMMARY

There is a rhythm game where a user provides an input by, for example, a tap operation at a timing in accordance with music.

However, there is room for improvement in providing an input in the rhythm game, using an input apparatus that deforms by applying a force to the input apparatus.

Therefore, it is an object of the exemplary embodiment to provide a game system capable of performing a rhythm game using an input apparatus that deforms by applying a force to the input apparatus.

To achieve the above object, the exemplary embodiment employs the following configurations.

A game system according to the exemplary embodiment is a game system for providing a user with a rhythm game where a plurality of timings for evaluating a user input are set. The game system includes an input apparatus, a sensor, and at least one processor. The input apparatus includes a member, at least a part of which elastically deforms by the user applying a force to the input apparatus. The sensor is configured to provide an output corresponding to deformation of the input apparatus. The at least one processor is configured to acquire, as a user input, information based on the output of the sensor. The at least one processor is configured to execute the rhythm game. The at least one processor is configured to, during the execution of the rhythm game, give the same evaluation to the user input in a case where the input apparatus deforms at any of the timings, and a case where the input apparatus deforms from a time before the timing to the timing.

Based on the above, the same evaluation is given in a case where an input apparatus deforms in a timing, and a case where the input apparatus deforms from a time before the timing. Consequently, it is possible to improve convenience for a user regarding a user input when a rhythm game is performed using an input apparatus that deforms by applying a force to the input apparatus.

Further, the at least one processor may be configured to evaluate the user input related to the deformation more against the user in a case where the input apparatus deforms after the timing, than in a case where the input apparatus deforms before the timing.

Based on the above, in a case where the deformation of the input apparatus is started behind the timing, an evaluation is made against the user. Thus, it is possible to make evaluation suitable for the rhythm game.

Further, at the timing, the at least one processor may be configured to give the same evaluation to the user input in (a) a case where the input apparatus deforms at a first timing, and the deformation continues also at a time point of a second timing after the first timing, and (b) a case where the input apparatus deforms at the first timing, then, the input apparatus returns to a steady state, and the input apparatus deforms again at the second timing.

Based on the above, in the timing, the same evaluation can be given in a case where the input apparatus continues to deform from a first timing to a second timing, and a case where the input apparatus deforms at the first timing, and then, the input apparatus returns and deforms again at the second timing.

Further, the at least one processor may be configured to evaluate the user input based on a first determination for determining whether or not the input apparatus deforms at any of the timings, and a second determination based on a deformation amount of the input apparatus.

Based on the above, the user input can be evaluated based not only on the timing of the deformation of the input apparatus, but also on the deformation amount of the input apparatus.

Further, the at least one processor may be configured to, if it is determined in the first determination that the input apparatus deforms, make the second determination after a certain time elapses from a time point when it is determined that the input apparatus deforms, and evaluate the user input based on the deformation amount of the input apparatus in a certain period determined based on a time point when it is determined in the second determination that the input apparatus deforms.

Based on the above, for example, even in a case where the deformation amount increases from the time point when it is determined that the input apparatus deforms, an evaluation can be made based on the deformation amount after the increase. Thus, even if the timing when the user applies a force is somewhat delayed, it is possible to properly evaluate an input of the user.

Further, the at least one processor may be configured to set a first evaluation value based on the first determination, set a second evaluation value based on the second determination, and evaluate the user input based on the first evaluation value and the second evaluation value.

Based on the above, the user input can be evaluated by separately setting a first evaluation value based on the timing of the deformation, and a second evaluation value based on the deformation amount. Consequently, it is possible to perform a rhythm game taking into account an element of an input timing and an element of an exercise amount.

Further, the at least one processor may be configured to, if the input apparatus deforms at the timing, set a predetermined value as the first evaluation value, and if the input apparatus deforms after the timing, set a value lower than the predetermined value as the first evaluation value, and if the input apparatus deforms at the timing or if the input apparatus deforms after the timing, set the second evaluation value in accordance with the deformation amount of the input apparatus, and evaluate the user input based on the first evaluation value and the second evaluation value.

Based on the above, if an input timing is behind a predetermined timing, the first evaluation value that is low is set, and the second evaluation value is set in accordance with the deformation amount of the input apparatus. Thus, it is possible to evaluate the user input based on the first evaluation value and the second evaluation value.

Further, the at least one processor may be configured to output a first sound effect based on a result of the first determination, and output a second sound effect based on a result of the second determination.

Based on the above, for example, a first sound effect can be output at the timing when the deformation of the input apparatus is detected, and then, a second sound effect taking into account the deformation amount of the input apparatus can be output. Consequently, it is possible to output the first sound effect in time for an input of the user and also output an appropriate second sound effect on which the evaluation of the input of the user is reflected.

Further, the at least one processor may be further configured to display on a display apparatus an instruction sign for presenting any of the timings to the user.

Based on the above, it is possible to present the timing of an input to the user by displaying an instruction sign.

Further, the rhythm game may include a first type of timing when a user input based on the deformation of the input apparatus is evaluated, and a second type of timing when a user input different from the deformation of the input apparatus is evaluated. The at least one processor may be configured to, regarding the second type of timing, control display so that the instruction sign moves in a form in which the instruction sign reaches a determination area at the second type of timing, and regarding the first type of timing, control display so that the instruction sign moves in a form in which the instruction sign reaches the determination area at a timing ahead of the first type of timing.

Based on the above, before a first type of timing when the user input is evaluated based on the deformation of the input apparatus, the instruction sign can be moved to a determination area. Consequently, even in a case where an input is provided by deforming the input apparatus, it is possible to prevent the timing when the input is detected from being delayed. Thus, it is possible to provide an input at a timing intended by the user.

Further, the at least one processor may be configured to display the instruction sign to move in a near direction from a position in a depth direction of a screen of the display apparatus.

Based on the above, the instruction sign can be moved in a near direction from a position in a depth direction of a screen. Consequently, even if the timing when the user input is evaluated and the timing when the instruction sign reaches a determination area are somewhat shifted from each other, it is possible to provide display without giving an uncomfortable feeling to the user.

Further, the at least one processor may be configured to move the instruction sign from an initial position to one of three or more determination areas. The at least one processor may be further configured to: detect an orientation of the input apparatus; in accordance with the orientation of the input apparatus, specify one of the three or more determination areas; and if the instruction sign is present in the specified determination area, and the input apparatus deforms at any of the timings, evaluate the user input in favor of the user.

Based on the above, by deforming the input apparatus and also changing the orientation of the input apparatus, it is possible to provide an input and bring diversity to a rhythm game.

Further, if the input apparatus continues to deform, and even if the orientation of the input apparatus changes, the currently specified determination area may continue to be specified.

Based on the above, when the input apparatus continues to deform, and even if the orientation of the input apparatus changes unintentionally, it is possible to fix a specified determination area.

Further, if the determination area where the instruction sign is present is specified once at the timing, the determination area may continue to be specified regardless of the orientation of the input apparatus until the timing elapses.

Based on the above, if a certain determination area is specified by the instruction sign in accordance with the orientation of the input apparatus at the timing, the specified determination area can be fixed until the timing elapses. Consequently, for example, even in a case where the orientation of the input apparatus changes unintentionally, it is possible to continuously specify the determination area specified once.

Further, the input apparatus may be held by a hand of the user. The instruction sign may be moved from an initial position to a first determination area or a second determination area. The at least one processor may be further configured to: detect a motion of a leg of the user; in accordance with the detected motion of the leg of the user, specify the first determination area or the second determination area; and if the instruction sign is present in the specified determination area at the timing, evaluate the user input in favor of the user.

Based on the above, it is possible to provide an input using hands and legs. Thus, in a rhythm game, it is possible to cause the user to do an exercise using their hands and legs.

Another exemplary embodiment may be an information processing apparatus that performs processing performed by the above game system, or may be an information processing program executed by an information processing apparatus, or may be an information processing method performed by the above game system.

According to the exemplary embodiment, it is possible to perform a rhythm game using an input apparatus that deforms by applying a force to the input apparatus.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is an example non-limiting diagram showing the state where a user uses the ring-shaped extension apparatus 5 and a belt-shaped extension apparatus 6;

FIG. 12 is an example non-limiting diagram showing an example of the movement path of an instruction sign and is an example non-limiting diagram viewing the state where the instruction sign moves, from a horizontal direction in a virtual space;

DETAILED DESCRIPTION OF NON-LIMITING EXAMPLE EMBODIMENTS

Figure 1:
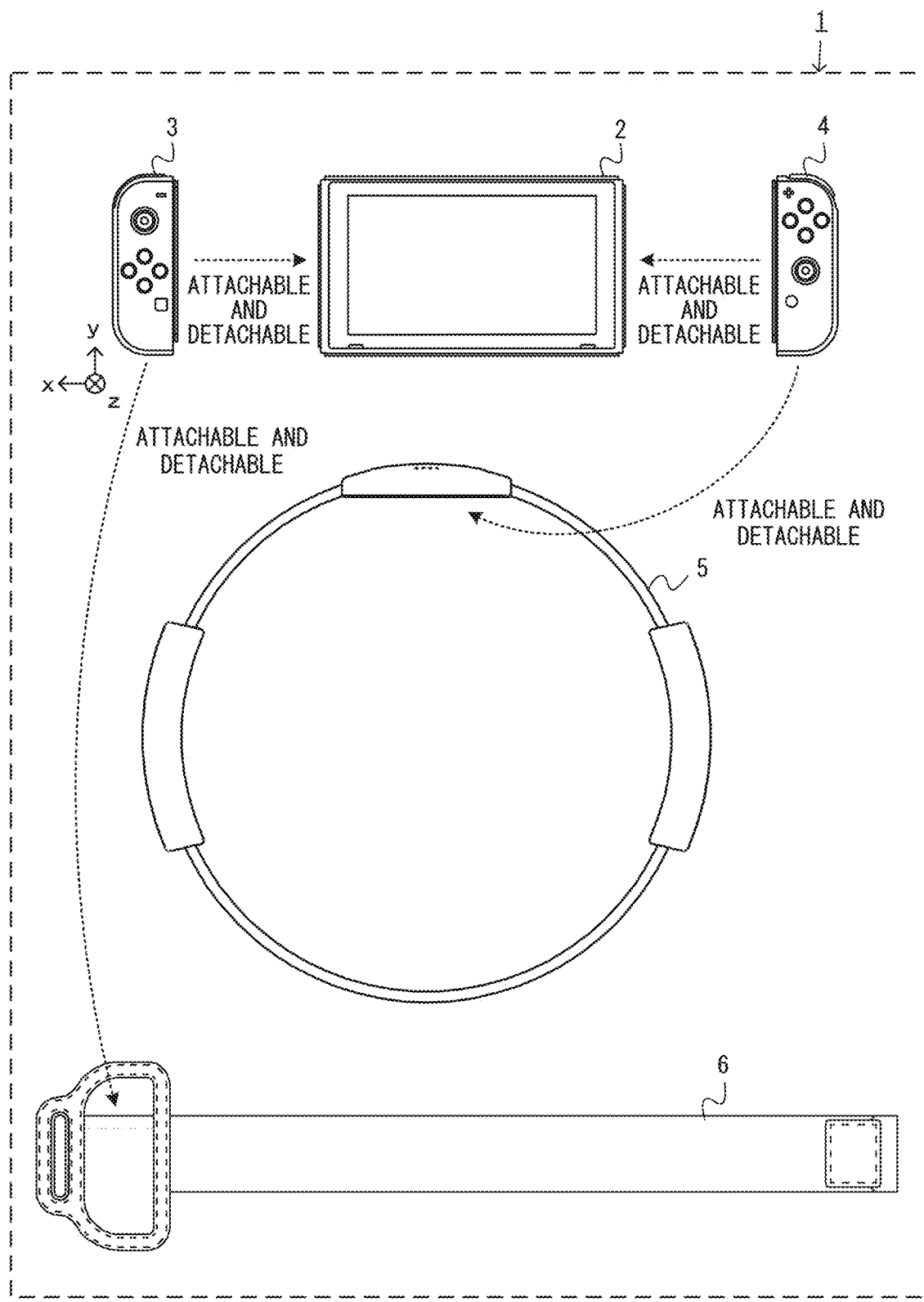
FIG. 1 is an example non-limiting diagram showing apparatuses included in a game system.

A game system according to an example of an exemplary embodiment is described below. FIG. 1 is a diagram showing examples of apparatuses included in the game system. As shown in FIG. 1, a game system 1 includes a main body apparatus 2, a left controller 3, a right controller 4, a ring-shaped extension apparatus 5, and a belt-shaped extension apparatus 6.

The main body apparatus 2 is an example of an information processing apparatus and functions as a game apparatus main body in the exemplary embodiment. Each of the left controller 3 and the right controller 4 is attachable to and detachable from the main body apparatus 2 (see FIG. 1). That is, a user can use a unified apparatus obtained by attaching each of the left controller 3 and the right controller 4 to the main body apparatus 2. Further, the user can also use the main body apparatus 2, the left controller 3, and the right controller 4 as separate bodies. It should be noted that hereinafter, main body apparatus 2 and the controllers 3 and 4 will be occasionally collectively referred to as a "game apparatus".

The ring-shaped extension apparatus 5 is an example of an extension apparatus used in the right controller 4. The ring-shaped extension apparatus 5 is used in the state where the right controller 4 is attached to the ring-shaped extension apparatus 5. Further, the belt-shaped extension apparatus 6 is an example of an extension apparatus used in the left controller 3. The belt-shaped extension apparatus 6 is used in the state where the left controller 3 is attached to the belt-shaped extension apparatus 6. As described above, in the exemplary embodiment, the user can also use the controllers 3 and 4 in the state where the controllers 3 and 4 are attached to the respective extension apparatuses (see FIG. 6). It should be noted that not only the right controller 4 but also the left controller 3 may be attachable to the ring-shaped extension apparatus 5. Not only the left controller 3 but also the right controller 4 may be attachable to the belt-shaped extension apparatus 6. Using these extension apparatuses, it is possible to extend or change the functions and the use forms of the controllers. It should be noted that these extension apparatuses can be referred to simply as "peripheral devices".

Figure 2:
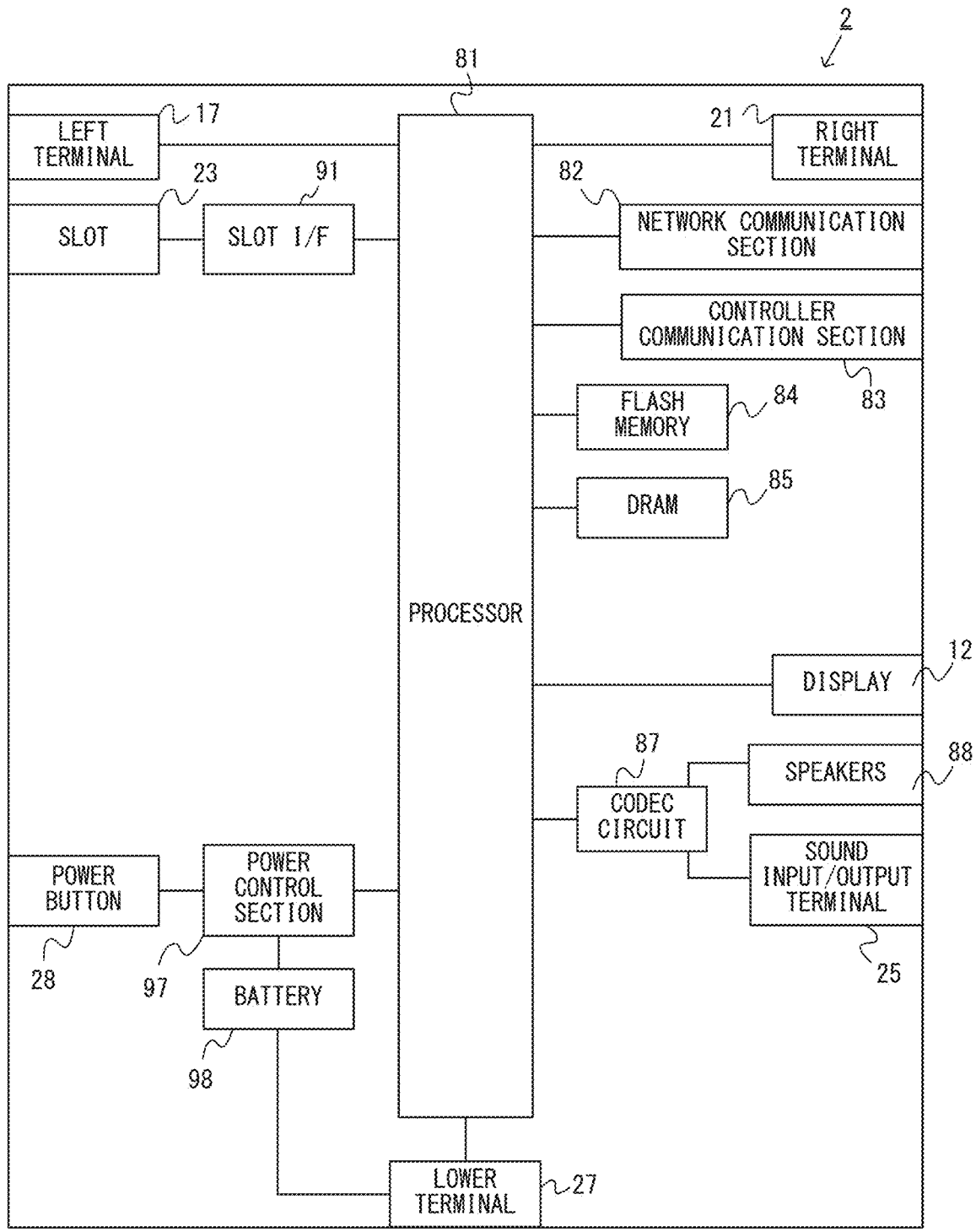
FIG. 2 is an example non-limiting block diagram showing the internal configuration of a main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 for storing a program and data, and a DRAM (Dynamic Random Access Memory) 85 for temporarily storing various pieces of data used in information processing as examples of internal storage media built into the main body apparatus 2.

The main body apparatus 2 includes a slot interface (hereinafter abbreviated as "I/F") 91. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 communicates with an external apparatus via a network (e.g., a wireless LAN).

The main body apparatus 2 includes a controller communication section 83. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Further, the main body apparatus 2 includes a left terminal 17 for connecting the left controller 3, a right terminal 21 for connecting the right controller 4, and a lower terminal 27. When a cradle 5 is connected to the lower terminal 27, the main body apparatus 2 can output data (e.g., image data and sound data) to a stationary monitor or the like via the cradle 5.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is a circuit for controlling the input and output of sound data to and from the speakers 88 and the sound input/output terminal 25.

The main body apparatus 2 includes a power control section 97 and a battery 98. Further, although not shown in FIG. 7, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
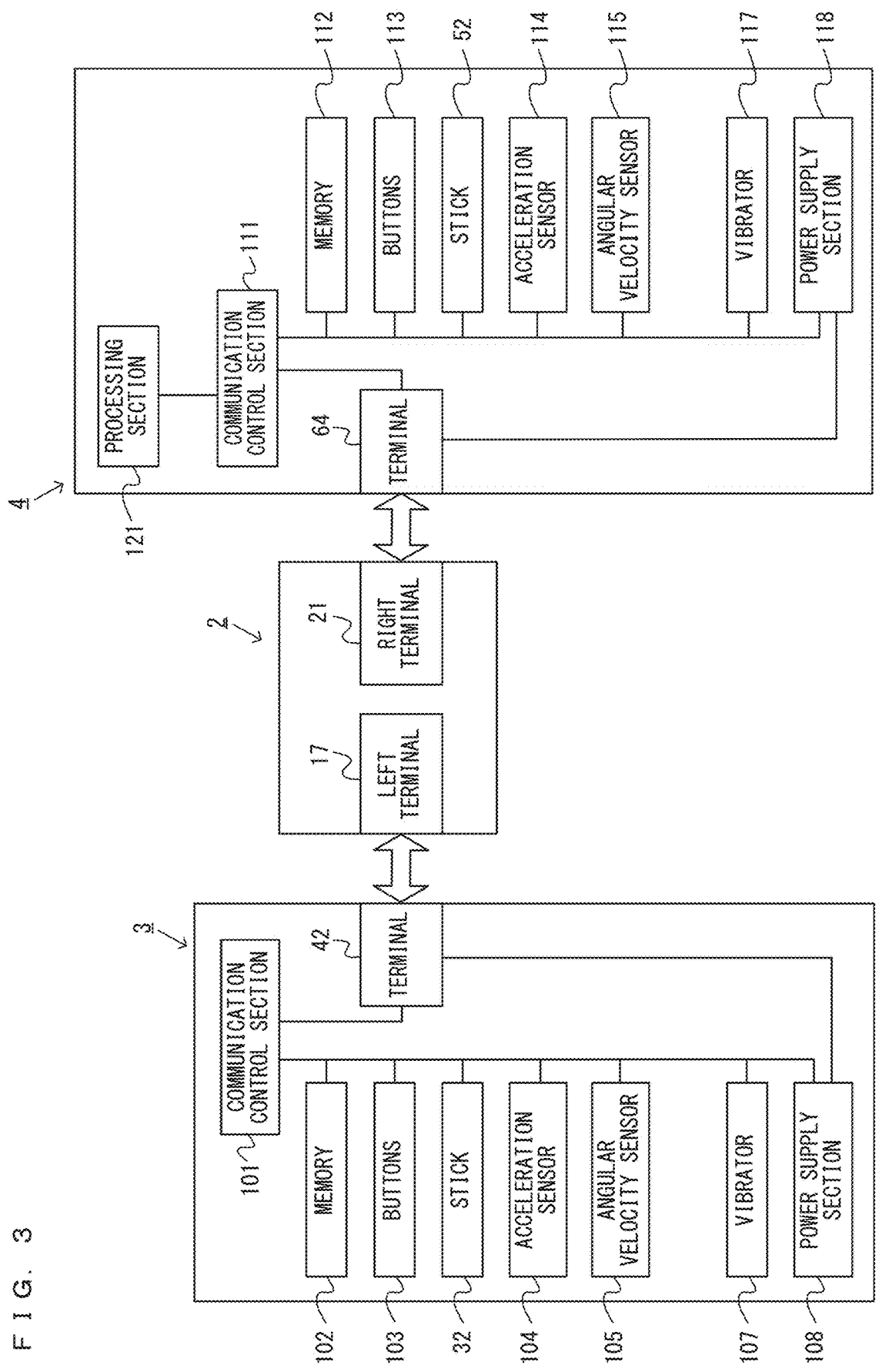
FIG. 3 is an example non-limiting block diagram showing the internal configurations of the main body apparatus 2 and a left controller 3 and a right controller 4.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

The left controller 3 includes a communication control section 101, which communicates with the main body apparatus 2. As shown in FIG. 3, the communication control section 101 is connected to components including the terminal 42. In the exemplary embodiment, the communication control section 101 can communicate with the main body apparatus 2 through both wired communication via the terminal 42 and wireless communication not via the terminal 42.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 3) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104 and an angular velocity sensor 105. In the exemplary embodiment, the acceleration sensor 104 detects the magnitudes of accelerations along predetermined three axial (e.g., xyz axes shown in FIG. 1) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 1). It should be noted that the angular velocity sensor 105 may detect an angular velocity about one axis or angular velocities about two axes. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. For example, the main body apparatus 2 can calculate information regarding the motion and/or the orientation of the left controller 3 based on the operation data (specifically, the detection results of the acceleration sensor 104 and the angular velocity sensor 105).

Further, the left controller 3 includes a vibrator 107. Based on a command from the main body apparatus 2, the vibrator 107 vibrates with a specified frequency and a specified intensity.

Further, the left controller 3 includes a power supply section 108 including a battery.

Similarly, the right controller 4 includes a communication control section 111 that communicates with the main body apparatus 2, a memory 112, buttons 113, an analog stick 52, inertial sensors (an acceleration sensor 114 and an angular velocity sensor 115), a vibrator 117, and a power supply section 118. These components have functions similar to those of the above components of the left controller 3.

The right controller 4 includes a processing section 121. The processing section 121 is connected to the communication control section 111. The processing section 121 includes a CPU, a memory, and the like. Based on a predetermined program (e.g., an application program for various calculations) stored in a storage device (e.g., a non-volatile memory or the like) (not shown) included in the right controller 4, and in accordance with a command from the main body apparatus 2, the processing section 121 performs a process. It should be noted that a memory used by the processing section 121 to perform processing may be provided in the processing section 121 or may be the memory 112.

Figure 4:
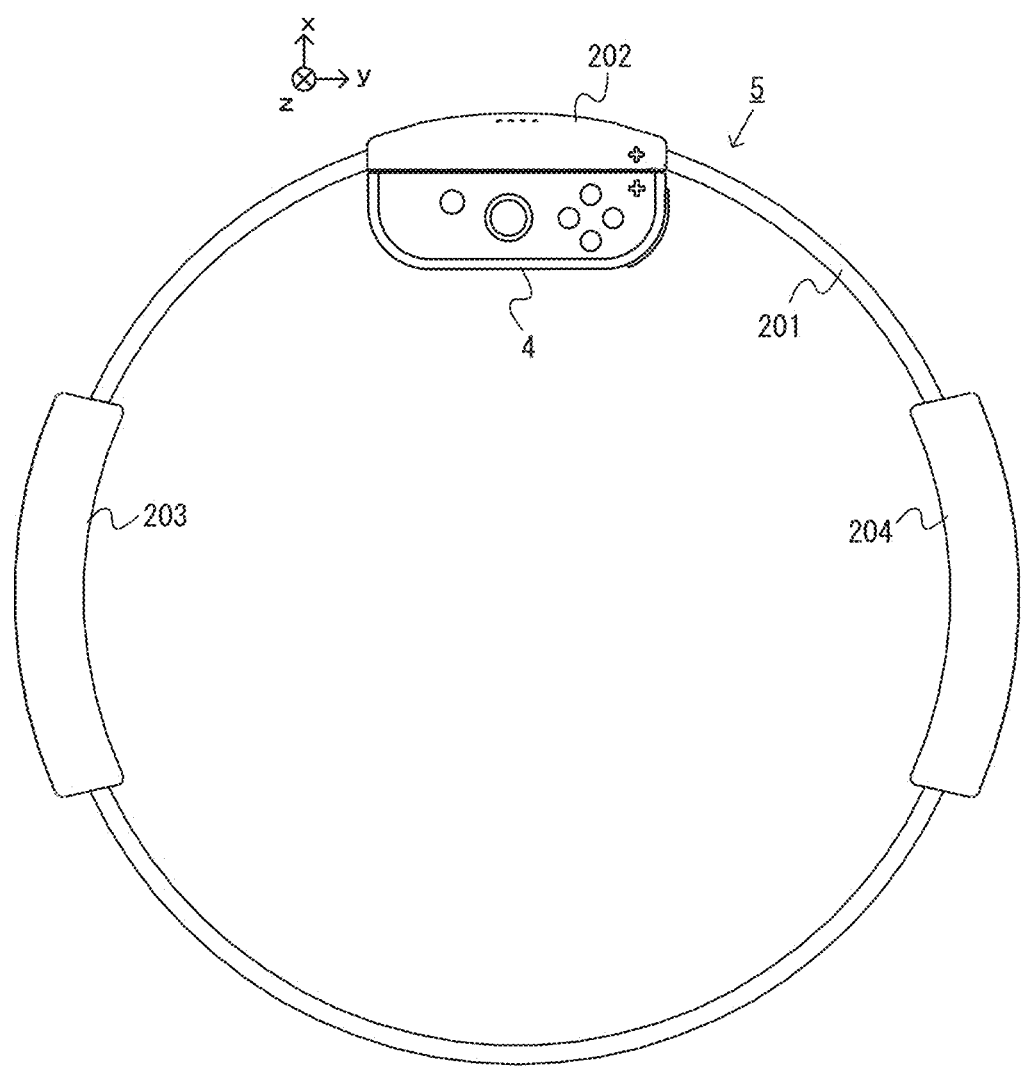
FIG. 4 is an example non-limiting diagram showing a ring-shaped extension apparatus 5.

FIG. 4 is a diagram showing an example of a ring-shaped extension apparatus. It should be noted that FIG. 4 shows the ring-shaped extension apparatus 5 in the state where the right controller 4 is attached to the ring-shaped extension apparatus 5. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 4, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

As shown in FIG. 4, the ring-shaped extension apparatus 5 includes grip covers 203 and 204. The grip covers 203 and 204 are components to be held by the user. In the present embodiment, the grip covers 203 and 204 can be removed from the ring-shaped portion 201. In the exemplary embodiment, the left grip cover 203 is provided in a left holding portion near the left end of the ring-shaped portion 201, and the right grip cover 204 is provided in a right holding portion near the right end of the ring-shaped portion 201. It should be noted that the number of holding portions is optional, and in accordance with an operation method to be assumed, holding portions may be provided in three or more places, or a holding portion may be provided in only a single place. Further, depending on the content of the game (or the content of a fitness operation to be performed by the user in the game), only a particular holding portion among a plurality of holding portions may be held by one hand or both hands.

Figure 5:
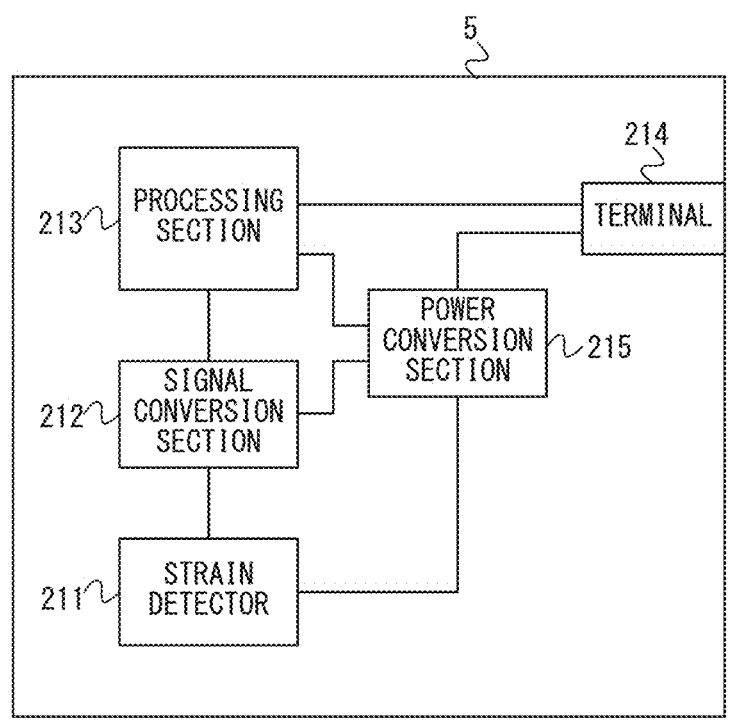
FIG. 5 is an example non-limiting block diagram showing an electrical connection relationship between components of the ring-shaped extension apparatus 5.

FIG. 5 is a block diagram showing an electrical connection relationship between components of the ring-shaped extension apparatus 5. As shown in FIG. 5, the ring-shaped extension apparatus 5 includes a strain detector 211. The strain detector 211 is an example of a detector that detects deformation of the ring-shaped portion 201. In the present embodiment, the strain detector 211 includes a strain gauge. The strain detector 211 outputs a signal representing the strain of the base portion in accordance with the deformation of the elastic member (in other words, a signal representing the magnitude of deformation and the direction of deformation of the elastic member).

Here, in the exemplary embodiment, the ring-shaped portion 201 includes the elastic member that can elastically deform and the base portion. The base portion holds end portions of the elastic member so that a ring is formed by the base portion and the elastic member. It should be noted that the base portion is provided within the main portion 202, and therefore is not shown in FIG. 4. The base portion is composed of a material having higher stiffness than that of the elastic member. For example, the elastic member is composed of a resin (specifically, FRP (Fiber Reinforced Plastics)), and the base portion is composed of a metal. The strain gauge is provided in the base portion and detects the strain of the base portion. When the ring-shaped portion 201 deforms from a steady state, the base portion strains due to the deformation. Thus, the strain gauge detects the strain of the base portion. Based on the detected strain, it is possible to calculate the direction in the ring-shaped portion 201 deforms (i.e., the direction in which the two grip covers 203 and 204 come close to or go away from each other) and the deformation amount.

It should be noted that in another exemplary embodiment, the strain detector 211 may include any sensor capable of detecting that the ring-shaped portion 201 deforms from the steady state, instead of the strain gauge. For example, the detector 211 may include a pressure-sensitive sensor that detects pressure applied when the ring-shaped portion 201 deforms, or may include a bending sensor that detects the amount of bending the ring-shaped portion 201.

The ring-shaped extension apparatus 5 includes a signal conversion section 212. In the present embodiment, the signal conversion section 212 includes an amplifier and an AD converter. The signal conversion section 212 is electrically connected to the strain detector 211 so as to amplify the output signal from the strain detector 211 through the amplifier and performs an AD conversion through the AD converter. The signal conversion section 212 outputs a digital signal representing the strain value detected by the strain detector 211. Note that in other embodiments, the signal conversion section 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal conversion section 212, and the output signal from the signal conversion section 212 is input to the processing section 213. The ring-shaped extension apparatus 5 includes the terminal 214. The terminal 214 is electrically connected to the processing section 213. When the right controller 4 is attached to the ring-shaped extension apparatus 5, the processing section 213 sends information representing the strain value that is represented by the output signal from the signal conversion section 212 to the right controller 4 through the terminal 214.

The ring-shaped extension apparatus 5 includes a power conversion section 215. The power conversion section 215 is electrically connected to the sections 211 to 214. The power conversion section 215 supplies power, which is supplied from the outside (i.e., the right controller 4) through the terminal 214, to the sections 211 to 214. The power conversion section 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the deformation amount of the elastic member 241 based on the strain value, which is the detection result, and the "data regarding the detection result of the strain detector" may be data that represents the deformation amount.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

FIG. 6 is a diagram showing an example of the state where the user uses the ring-shaped extension apparatus 5 and the belt-shaped extension apparatus 6. As shown in FIG. 6, the user plays a game using two extension apparatuses 5 and 6 in addition to a game apparatus (e.g., the main body apparatus 2 and the controllers 3 and 4).

Specifically, as shown in FIG. 6, the user holds with both hands the ring-shaped extension apparatus 5 to which the right controller 4 is attached. Then, the user fastens to their leg the belt-shaped extension apparatus 6 to which the left controller 3 is attached. Further, the main body apparatus 2 is connected to the cradle 5, and a game image generated by the main body apparatus 2 is displayed on a stationary monitor 6. The user performs a game while viewing the game image displayed on the stationary monitor 6.

When the game process is executed on the main body apparatus 2, the right controller 4 receives strain data from the ring-shaped extension apparatus 5. The strain data includes information that represents the strain value. Specifically, the processing section 213 of the ring-shaped extension apparatus 5 transmits the strain data to the right controller 4 through the terminal 214. For example, the processing section 213 repeatedly transmits the strain data at the rate of once per a predetermined amount of time.

In such a case, the communication control section 111 of the right controller 4 transmits the strain data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in the state where the right controller 4 is attached to the ring-shaped extension apparatus 5, the communication from the right controller 4 to the main body apparatus 2 is done by wireless communication. The communication control section 111 may transmit the right controller operation data and the strain data together with each other to the main body apparatus 2, or may transmit the data separately to the main body apparatus 2. The communication control section 111 may transmit the received strain data to the main body apparatus 2 as it is, or may perform some processes (e.g., data format conversion and/or an arithmetic process on the strain value, etc.) on the received strain data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. In the state where the left controller 3 is attached to the belt-shaped extension apparatus 6, the communication from the left controller 3 to the main body apparatus 2 is done by wireless communication.

(Overview of Game According to Exemplary Embodiment)

Next, an overview of a game according to the exemplary embodiment is described. In the exemplary embodiment, a rhythm game is performed using the ring-shaped extension apparatus 5 to which the right controller 4 is attached, and the belt-shaped extension apparatus 6 to which the left controller 3 is attached. The rhythm game is a game where an input of the user is evaluated at each of a plurality of timings determined corresponding to music, and is also occasionally termed "music game". The rhythm game according to the exemplary embodiment is a fitness game for causing the user to exercise. As shown in FIG. 6, in the state where the user holds the ring-shaped extension apparatus 5 with both hands, and the belt-shaped extension apparatus 6 is fastened to their leg (e.g., their thigh), the user exercises according to an instruction displayed on the monitor 6, thereby playing the rhythm game. Hereinafter, the ring-shaped extension apparatus 5 to which the right controller 4 is attached will be occasionally referred to as a "ring controller", and the belt-shaped extension apparatus 6 to which the left controller 3 is attached will be occasionally referred to as a "leg controller".

In the rhythm game according to the exemplary embodiment, the user performs an operation so that the ring controller is in an appropriate state at a predetermined timing determined corresponding to music. Hereinafter, first, operations on the ring controller performed by the user will be described, and then, the rhythm game according to the exemplary embodiment will be described.

Figure 7:
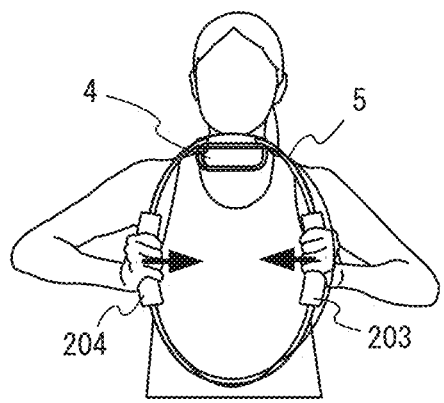
FIG. 7 is an example non-limiting diagram showing a push-in operation, which is operations on a ring controller.
Figure 8:
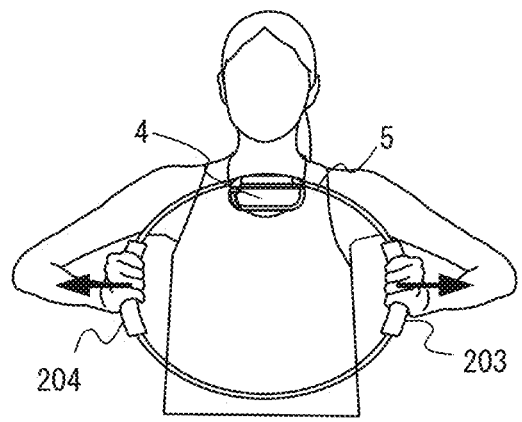
FIG. 8 is an example non-limiting diagram showing a pull operation, which is the operations on the ring controller.
Figure 9:
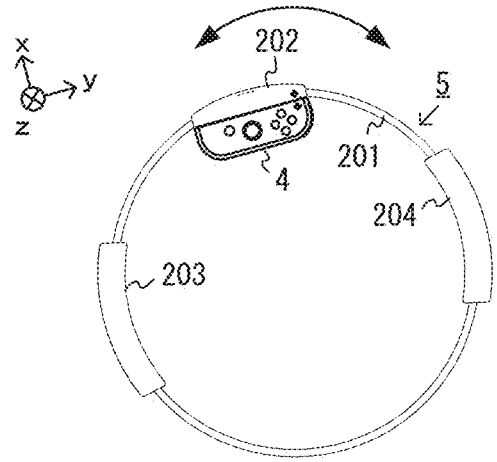
FIG. 9 is an example non-limiting diagram showing a twist operation, which is the operations on the ring controller.

FIG. 7 is a diagram showing a push-in operation, which is an example of the operations on the ring controller. FIG. 8 is a diagram showing a pull operation, which is an example of the operations on the ring controller. FIG. 9 is a diagram showing a twist operation, which is an example of the operations on the ring controller.

As shown in FIG. 7, while holding the grip covers 203 and 204 of the ring controller with both hands, the user operates the ring controller by pushing in the ring controller from the left and right directions toward the center of the ring. When this push-in operation is performed, the ring controller deforms from a circular ring shape to an approximately elliptical shape of which the short axis is a line segment connecting the grip covers 203 and 204. At this time, the strain detector 211 (a sensor for detecting the deformation of the ring controller, specifically the strain gauge) outputs a signal indicating the strain of the base portion corresponding to the deformation of the elastic member. Based on this signal, data (strain data) regarding the detection result of the strain detection section is transmitted from the ring-shaped extension apparatus 5 to the right controller 4, and the right controller 4 transmits this data to the main body apparatus 2. Based on the data, the main body apparatus 2 acquires information regarding the deformation of the ring controller as an input of the user. For example, when the ring controller is pushed in, the main body apparatus 2 acquires a positive strain value. It should be noted that hereinafter, a positive strain value to be output when the ring controller is pushed in will be occasionally referred to as a "push-in amount". The "push-in amount" is an example of information indicating the deformation amount of the ring controller and differs in accordance with the strength of the force of pushing in the ring controller.

Further, as shown in FIG. 8, the user can also operate the ring controller by pulling the ring controller from the center of the ring toward the left and right directions. When this pull operation is performed, the ring controller deforms from the circular ring shape to an approximately elliptical shape of which the long axis is a line segment connecting the grip covers 203 and 204. When the ring controller is pulled, the main body apparatus 2 acquires a negative strain value. It should be noted that hereinafter, a negative strain value to be output when the ring controller is pulled will be occasionally referred to as a "pull amount". The "pull amount" is an example of information indicating the deformation amount of the ring controller and differs in accordance with the strength of the force of pulling the ring controller.

As shown in FIG. 9, while holding the grip covers 203 and 204 of the ring controller with both hands, the user can rotate the ring controller about the central axis of the ring (an axis parallel to a z-axis of the right controller 4). Hereinafter, the operation of rotating the ring controller about the central axis of the ring will be occasionally referred to as a "twist operation", and the rotational angle of the twist operation about the central axis will be occasionally referred to as a "twist amount". The orientation of the ring controller when the twist amount is zero (i.e., the rotation about the z-axis is zero) is referred to as a "reference orientation".

The orientation of the ring controller (the right controller 4) is calculated based on data from the acceleration sensor 114 and the angular velocity sensor 115 of the right controller 4. Specifically, the main body apparatus 2 integrates angular velocity values detected by the angular velocity sensor 115, thereby calculating a change in the orientation from the reference orientation. Thus, the main body apparatus 2 can calculate the current orientation of the ring controller. Further, also based on acceleration values detected by the acceleration sensor 114, the main body apparatus 2 calculates the current orientation of the ring controller.

Figure 10:
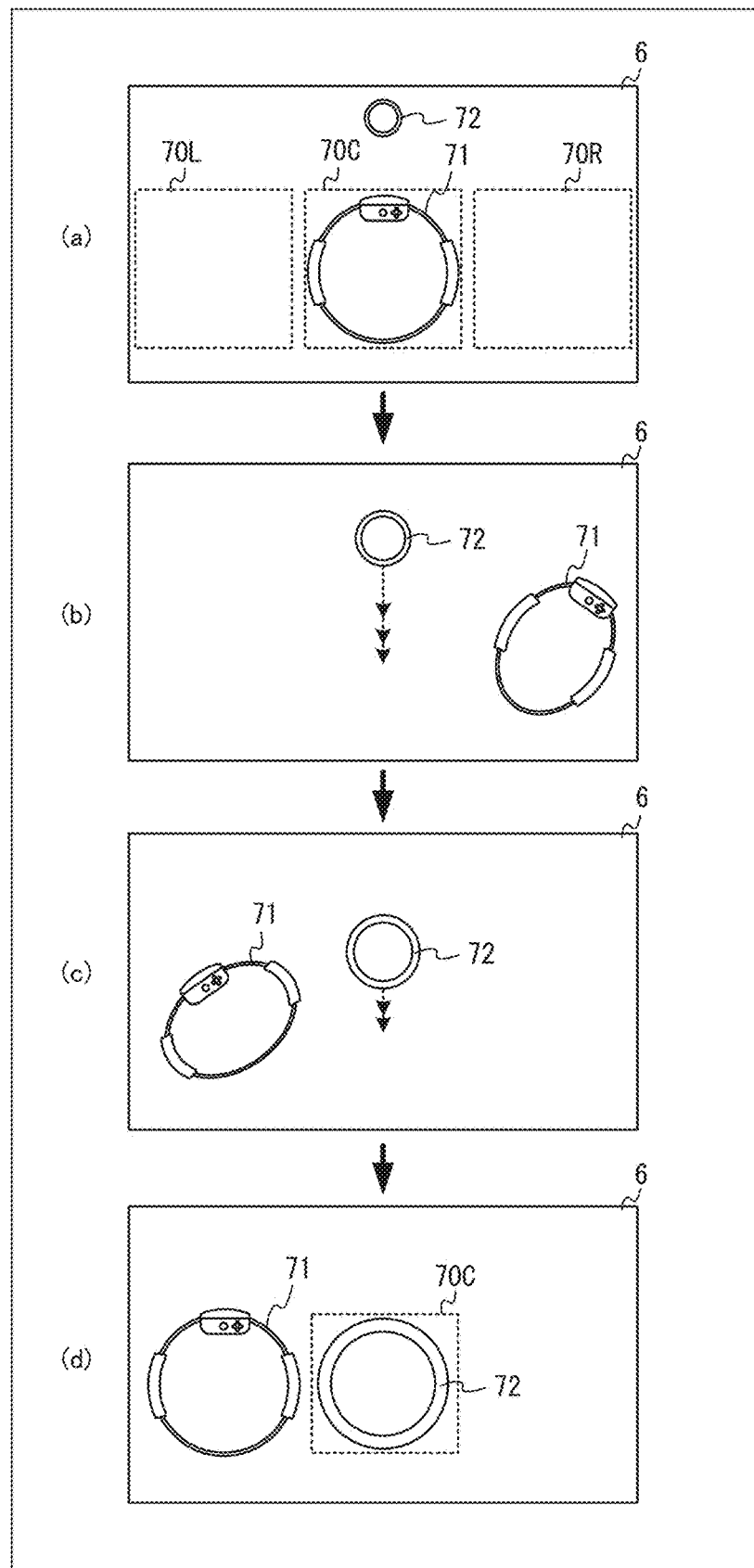
FIG. 10 is an example non-limiting diagram showing an example of a game image displayed during the execution of a rhythm game.

Next, a description is given of an example of a game image displayed on the stationary monitor 6 during the execution of the rhythm game according to the exemplary embodiment. FIG. 10 is a diagram showing an example of a game image displayed during the execution of the rhythm game.

As shown in FIG. 10, for example, a ring object 71 and a normal instruction sign 72 as an instruction sign are displayed on a screen of the monitor 6. Although not shown in the figures, a background image representing a game space is also displayed on the screen.

During the execution of the rhythm game, predetermined music is output, and the user performs the operations (the push-in operation, the pull operation, and the twist operation) on the ring controller at a predetermined timing determined corresponding to the music.

The ring object 71 is a virtual object representing the ring controller, and the display position and the shape of the ring object 71 change in accordance with the current orientation and shape of the ring controller. The ring object 71 is displayed in any of a center area 70C, a right area 70R, and a left area 70L. In the game according to the exemplary embodiment, a three-dimensional virtual space is displayed on the screen, a plane parallel to the screen is present at a predetermined position (e.g., the position of the screen) in a depth direction in the virtual space, and the plane is divided into three areas, namely center, left, and right areas. These three areas are the center area 70C, the right area 70R, and the left area 70L. In accordance with the orientation of the ring controller, the ring object 71 is displayed in any of the center area 70C, the right area 70R, and the left area 70L. As will be described below, the plane is also divided into upper and lower areas. That is, the plane is divided into three areas (center, left, and right) on the upper side and three areas (center, left, and right) on the lower side. In a standing position of the user, the ring object 71 is located in any of the three areas on the upper side. In a knee-bending position of the user, the ring object 71 is located in any of the three areas on the lower side.

For example, if the ring controller is in the reference orientation (i.e., the twist amount is zero), the ring object 71 is displayed in the center area 70C of the screen. If a right twist operation is performed on the ring controller (e.g., the ring controller is rotated clockwise by 30 degrees or more), the ring object 71 is displayed in the right area 70R of the screen. The orientation of the ring object 71 operates in conjunction with the orientation of the ring controller in real space. Thus, if the right twist operation is performed on the ring controller, the ring object 71 also rotates about an axis in the depth direction of the screen in accordance with the twist angle of the right twist operation. For example, if the ring controller is rotated clockwise, the ring object 71 also rotates clockwise about the axis in the depth direction of the screen. Then, when the rotational angle of the ring controller becomes greater than or equal to a predetermined angle, the ring object 71 moves to the right area 70R. If a left twist operation is performed on the ring controller (e.g., the ring controller is rotated counterclockwise by 30 degrees or more), the ring object 71 is displayed in the left area 70L of the screen and also rotates counterclockwise by a predetermined angle (e.g., 30 degrees) about the axis in the depth direction of the screen. In a case where the right twist operation or the left twist operation is performed on the ring controller, and while the ring object 71 is present in the center area 70C, the orientation of the ring object 71 may not change. Then, when the ring object 71 moves to the right area 70R or the left area 70L, the orientation of the ring object 71 may change.

If the push-in operation is performed on the ring controller, the ring object 71 changes to an elliptical shape whose short axis is in a left-right direction. In the exemplary embodiment, if the "push-in amount" corresponding to the detection result of the strain detector 211 exceeds a predetermined threshold, it is determined that the push-in operation is performed. In (b) of FIG. 10, the push-in operation is performed on the ring controller, and the right twist operation is performed on the ring controller. Thus, the ring object 71 is displayed in the right area 70R, changes to the elliptical shape whose short axis is in the left-right direction, and rotates clockwise by a predetermined angle.

If the pull operation is performed on the ring controller, the ring object 71 changes to an elliptical shape whose long axis is in the left-right direction. In the exemplary embodiment, if the "pull amount" corresponding to the detection result of the strain detector 211 exceeds a predetermined threshold (if the absolute value of the strain value exceeds a predetermined threshold), it is determined that the pull operation is performed. In (c) of FIG. 10, the pull operation is performed on the ring controller, and the left twist operation is performed on the ring controller. Thus, the ring object 71 is displayed in the left area 70L, changes to the elliptical shape whose long axis is in the left-right direction, and rotates counterclockwise by a predetermined angle.

An instruction sign is an image for instructing the user to operate the ring controller. In the exemplary embodiment, a plurality of instruction signs are prepared in accordance with the operations on the ring controller. The plurality of instruction signs include the normal instruction sign 72, a push-in instruction sign 73, and a pull instruction sign 74.

Figure 13:
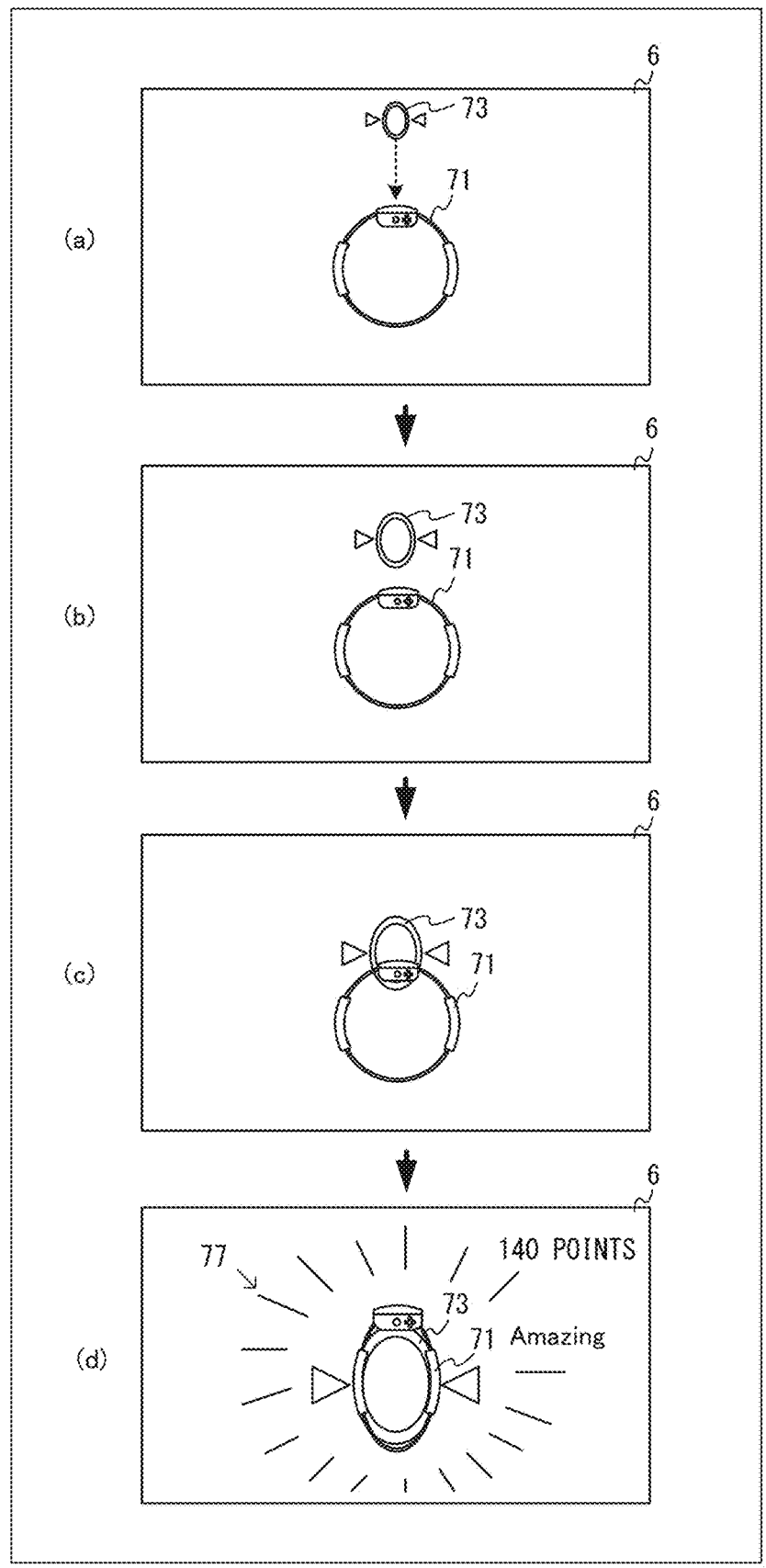
FIG. 13 is an example non-limiting diagram showing an example of a game image when a push-in instruction sign 73 is displayed during the execution of the rhythm game.
Figure 14:
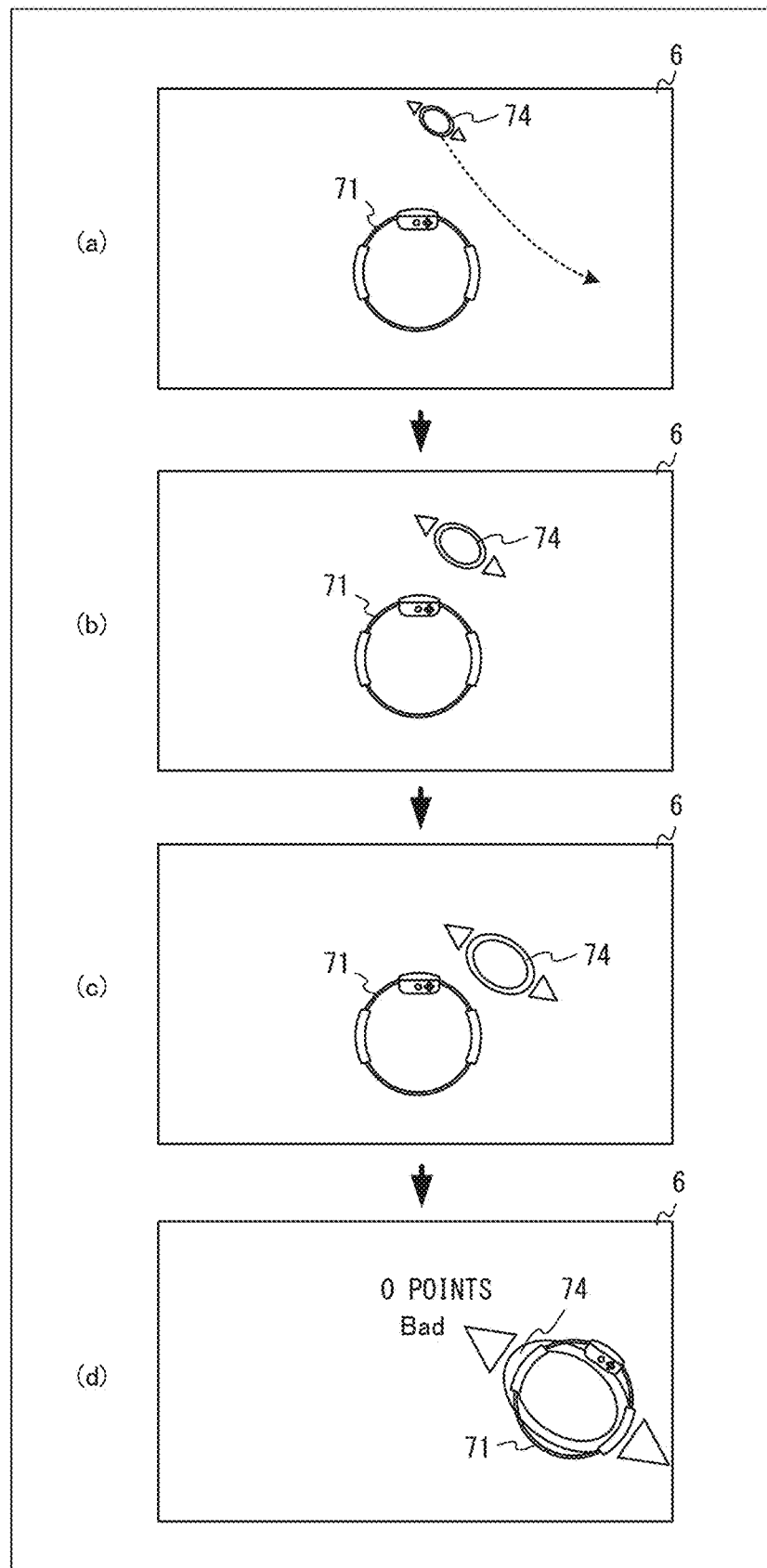
FIG. 14 is an example non-limiting diagram showing an example of a game image when a pull instruction sign 74 is displayed during the execution of the rhythm game.

As shown in FIG. 10, the normal instruction sign 72 is an image having a circular ring shape. The normal instruction sign 72 is an instruction sign indicating that the deformation of the ring controller is not required. The push-in instruction sign 73 is an instruction sign for instructing the user to perform the push-in operation. As shown in FIG. 13 described below, the push-in instruction sign 73 is an image obtained by deforming the image having the circular ring shape by pushing in the image having the circular ring shape from the left-right direction, and for example, is an elliptical shape whose short axis is in the left-right direction. The pull instruction sign 74 is an instruction sign for instructing the user to perform the pull operation. As shown in FIG. 14 described below, the pull instruction sign 74 is an image obtained by deforming the image having the circular ring shape by pulling the image having the circular ring shape in the left-right direction, and for example, is an elliptical shape whose long axis is in the left-right direction.

In the exemplary embodiment, as the plurality of instruction signs, in addition to the above, a continuous push-in instruction sign 75 (see FIG. 16) for giving an instruction to perform a continuous push-in operation, and a continuous pull instruction sign (not shown) for giving an instruction to perform a continuous pull operation are prepared. Additionally, as the plurality of instruction signs, an instruction sign for giving an instruction to perform a successive push-in operation (not shown), and an instruction sign for giving an instruction to perform a successive pull operation (not shown) may be prepared. Here, the continuous push-in operation (or pull operation) means that the state where the ring controller is pushed in (or pulled) is maintained for a predetermined time. The successive push-in operation (or pull operation) means that the push-in operation (or the pull operation) is performed multiple times for a predetermined time.

An instruction sign is displayed to move in the near direction from an initial position in the depth direction of the screen. While viewing the moving instruction sign and at the timing when the instruction sign reaches a predetermined position, using the ring controller, the user performs an operation for which an instruction is given by the instruction sign. If an appropriate operation is performed at an appropriate timing, points are given.

For example, at the time point of (a) of FIG. 10, the normal instruction sign 72 appears at the initial position in the depth direction of the screen. The normal instruction sign 72 moves in the near direction of the screen from the initial position and reaches the position of the screen at the time point when a predetermined time elapses. Specifically, the normal instruction sign 72 moves from the initial position in the depth direction of the screen toward any of the center area 70C, the right area 70R, and the left area 70L ((b) and (c) of FIG. 10). Then, at the time point when a predetermined time elapses after the normal instruction sign 72 appears at the initial position, the normal instruction sign 72 reaches any of the center area 70C, the right area 70R, and the left area 70L ((d) of FIG. 10).

At the timing when the normal instruction sign 72 reaches any of the center area 70C, the right area 70R, and the left area 70L, an input of the user is evaluated. Specifically, in a case where the ring object 71 is present in the same area as the normal instruction sign 72 at the timing when the normal instruction sign 72 reaches any of the center area 70C, the right area 70R, and the left area 70L, points are given.

During the output of music, any of the plurality of instruction signs appears in turn at the initial position and moves to any of the center area 70C, the right area 70R, and the left area 70L. Here, the center area 70C, the right area 70R, and the left area 70L are referred to as "determination areas". The positions of the determination areas in the depth direction of the screen match the position of the screen. The instruction sign moves approaching any of the determination areas (the screen) from the initial position in the depth direction of the screen. At the timing when the instruction sign reaches any of the determination areas, the user performs an operation corresponding to the instruction sign and thereby can earn points corresponding to the operation.

The timing when the user performs the operation corresponding to the instruction sign is basically determined in advance in accordance with the rhythm of the music. The instruction sign appears and moves to cause the user to perform the operation on the ring controller at each of a plurality of timings determined corresponding to the music. At each timing, an input of the user is evaluated, and points corresponding to the evaluation result are given.

Figure 11:
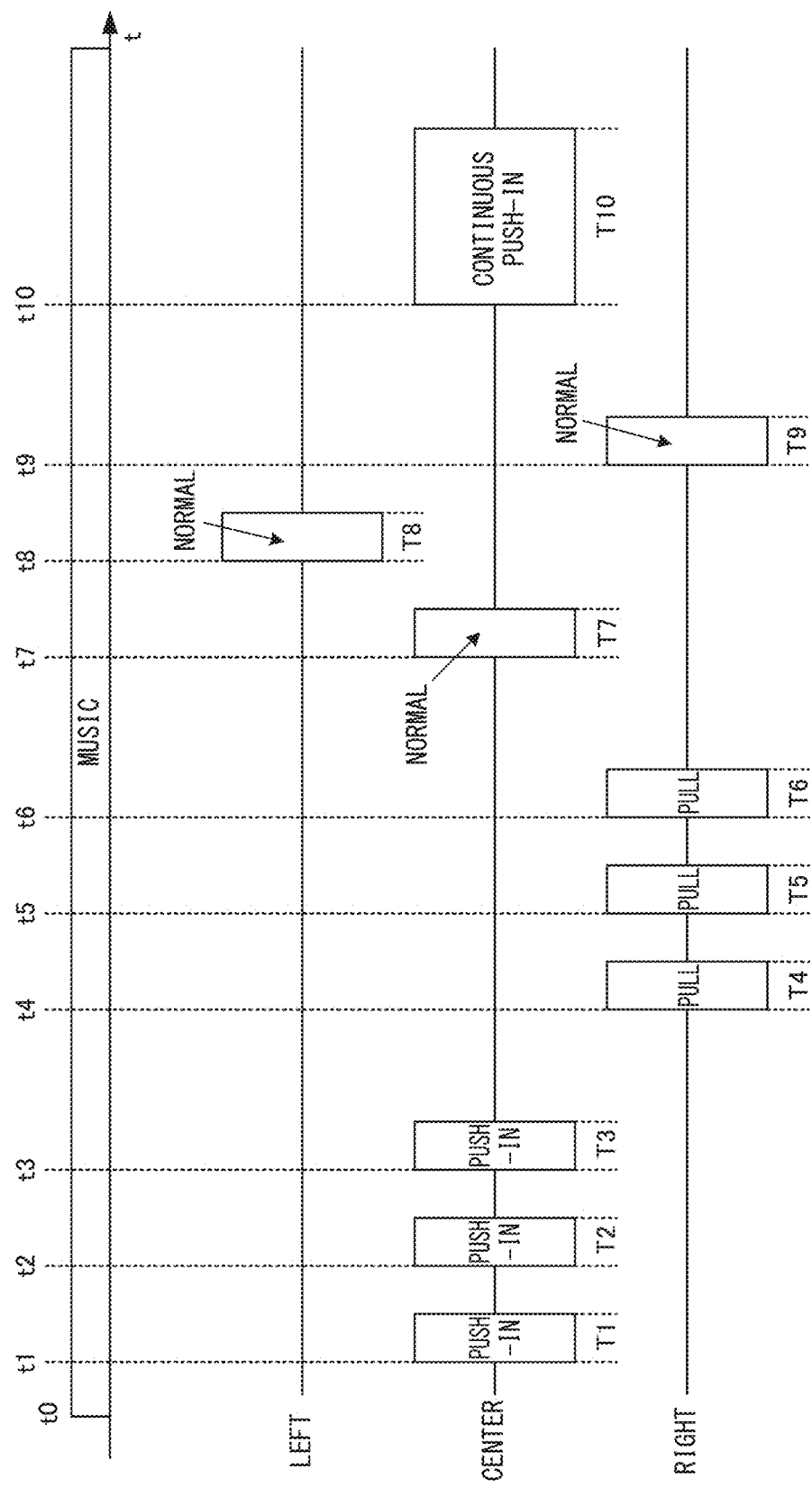
FIG. 11 is an example non-limiting diagram showing examples of the timings of inputs determined in accordance with the rhythm of particular music.

FIG. 11 is a diagram showing examples of the timings of inputs determined in accordance with the rhythm of particular music. In FIG. 11, the horizontal axis represents time, "center" indicates the center area 70C, "left" indicates the left area 70L, and "right" indicates the right area 70R. In FIG. 11, "push-in" indicates the push-in operation, and "pull" indicates the pull operation. "Normal" indicates an operation that does not require the deformation of the ring controller, and indicates the twist operation (the right twist operation, the left twist operation, or the operation of bringing the ring controller into the reference orientation) on the ring controller.

As shown in FIG. 11, a plurality of timings (T1, T2, T3, or the like) that match the rhythm of the music are determined in advance. An instruction using an instruction sign is given to cause the user to perform an operation using the ring controller at each timing shown in FIG. 11. At each timing, it is determined whether or not an input of the user is provided using the ring controller. Based on the result of the determination, the input of the user is evaluated.

For example, at a time point to, the output of the music is started. Then, the user is instructed to perform the push-in operation at a timing T1 that is a period based on a time point t1. At the timing T1, a determination regarding an input of the user is made, and points corresponding to the result of the determination are given. Specifically, at the timing T1, if the ring controller is in the reference orientation, and the push-in operation is performed on the ring controller, points are given.

Similarly, at a timing T2 that is a period based on a time point t2, if the ring controller is in the reference orientation, and the push-in operation is performed on the ring controller, points are given. At a timing T4 that is a period based on a time point t4, the user needs to perform the right twist operation and the pull operation. At the timing T4, if the right twist operation and the pull operation are performed, points are given. At a timing T7 that is a period based on a time point t7, it is necessary to control the ring controller to be in the reference orientation. At the timing T7, if the ring controller is in the reference orientation, points are given. At the timing T7, if the ring controller is in the reference orientation (i.e., if the ring object 71 is located in the center area 70C), regardless of whether the ring controller deforms or does not deform, points are given. That is, at the timing T7, the user does not need to deform the ring controller.

To cause the user to perform each operation at each timing (T1, T2, T3, or the like) shown in FIG. 11, the movement of any of the above instruction signs is controlled. Specifically, the movement of the instruction sign is controlled so that the instruction sign reaches any of the determination areas at each timing (T1, T2, T3, or the like) shown in FIG. 11. For example, the movement of the push-in instruction sign 73 is controlled so that the push-in instruction sign 73 reaches the center area 70C at the timing T1. The movement of the pull instruction sign 74 is controlled so that the pull instruction sign 74 reaches the right area 70R at the timing T4. The movement of the normal instruction sign 72 is controlled so that the normal instruction sign 72 reaches the left area 70L at a timing T8. Although the details will be described below, in a case where an instruction sign (the push-in instruction sign 73 or the pull instruction sign 74) involving the deformation of the ring controller is displayed, the timing when the instruction sign reaches any of the determination areas and the timing when an input of the user is evaluated are shifted from each other.

At each timing (T1, T2, T3, or the like) shown in FIG. 11, in addition to the display of the instruction sign, a vibration may be output, thereby indicating the timing of the operation on the ring controller to the user. For example, the vibrator 117 of the right controller 4 (or the vibrator 107 of the left controller 3) may be vibrated, thereby indicating the timing of the operation to the user. For example, at each time point t1, t2, t3, or the like, the vibration of the right controller 4 may be started, thereby indicating the timing of the operation to the user. In each period (T1, T2, T3, or the like) when the operation of the user is evaluated, the vibration may be continued. The pattern of the vibration may be varied in accordance with the type of the instruction sign (the type of the operation).

In the rhythm game according to the exemplary embodiment, a plurality of pieces of music are prepared in advance, and the timings of inputs as shown in FIG. 11 are determined in advance in accordance with each piece of music.

FIG. 12 is a diagram showing an example of the movement path of an instruction sign and is a diagram viewing the state where the instruction sign moves, from a horizontal direction in the virtual space. As shown in FIG. 12, the viewpoint of the user (a virtual camera) is placed at a predetermined position in the virtual space and directed in the positive z-axis direction. The instruction sign moves in a curve in the negative z-axis direction and a down direction from a predetermined position in the z-axis direction from the virtual camera and also the initial position at a predetermined height. Specifically, the instruction sign moves such that the closer to the virtual camera (the viewpoint of the user) the instruction sign is, the closer to horizontal the moving direction of the instruction sign is (the smaller the angle to the z-axis is). If a game image generated based on the virtual camera is displayed on the screen, as shown in FIG. 10, the state where the instruction sign comes close in the near direction from the depth direction of the screen is displayed. If the instruction sign reaches the position of the virtual camera (the position of the screen), an image as shown in (d) of FIG. 10 is displayed.

The instruction sign moves in a curve as shown in FIG. 12, whereby it is easy for the user to recognize the timing when the instruction sign reaches any of the determination areas. For example, in a case where the instruction sign linearly moves parallel to the direction of the line of sight of the virtual camera, when the plurality of instruction signs move next to each other, the plurality of instruction signs may overlap each other. In this case, it may be difficult for the user to recognize the timings when the instruction signs reach the determination areas. In the exemplary embodiment, however, since the instruction sign moves in a curve, even if the plurality of instruction signs move next to each other, the instruction signs are less likely to overlap each other, and it is easy for the user to recognize the instruction signs. Thus, it is easy for the user to recognize the timings when the instruction signs reach the determination areas.

(Examples of Game Images)

Figure 15:
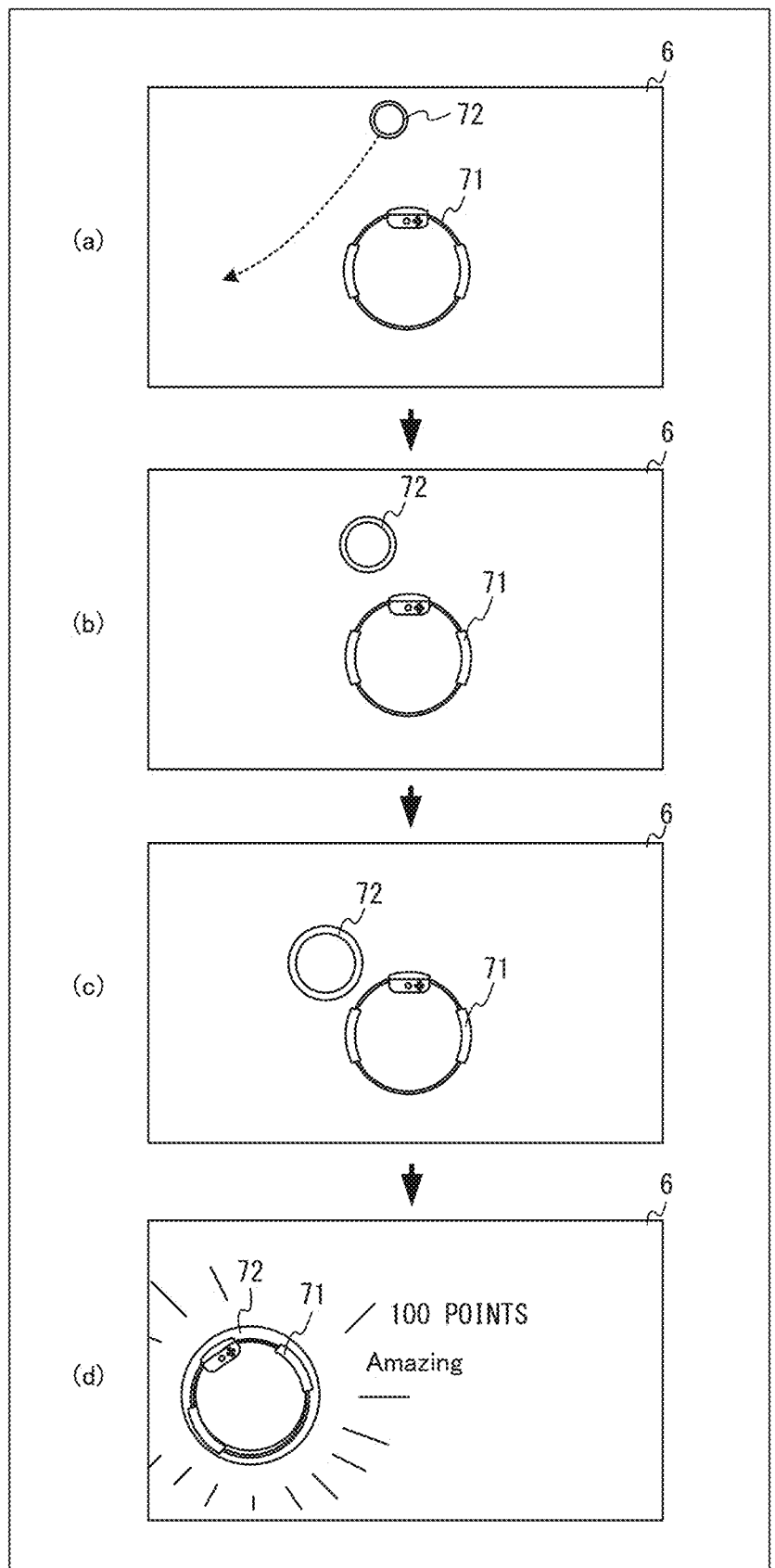
FIG. 15 is an example non-limiting diagram showing an example of a game image when a normal instruction sign 72 moves to a left area 70L during the execution of the rhythm game.
Figure 16:
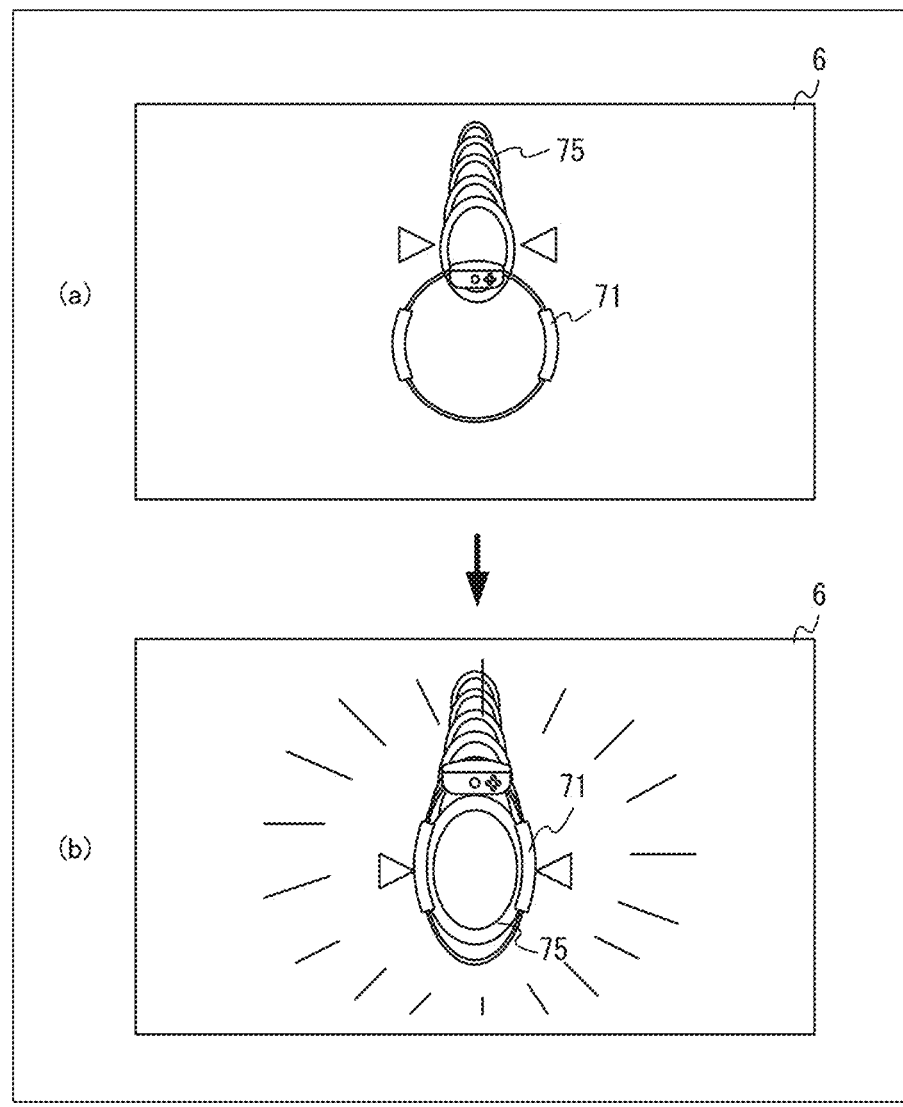
FIG. 16 is an example non-limiting diagram showing an example of a game image when a continuous push-in instruction sign 75 is displayed during the execution of the rhythm game.

Next, a description is given of examples of game images displayed during the rhythm game and the operations on the ring controller. FIG. 13 is a diagram showing an example of a game image when the push-in instruction sign 73 is displayed during the execution of the rhythm game. FIG. 14 is a diagram showing an example of a game image when the pull instruction sign 74 is displayed during the execution of the rhythm game. FIG. 15 is a diagram showing an example of a game image when the normal instruction sign 72 moves to the left area 70L during the execution of the rhythm game. FIG. 16 is a diagram showing an example of a game image when the continuous push-in instruction sign 75 is displayed during the execution of the rhythm game.

As shown in FIG. 13, at a certain time point (e.g., a time point a predetermined time before t1) during the output of the music, the push-in instruction sign 73 appears at the initial position ((a) of FIG. 13). The push-in instruction sign 73 moves approaching the screen along a center path from the initial position in the depth direction of the screen ((b) and (c) of FIG. 13). Then, as shown in (d) of FIG. 13, if the push-in operation on the ring controller is performed at the timing when the push-in instruction sign 73 reaches any of the determination areas (here, the center area 70C), points indicating the evaluation of the operation are given.

The points given here are calculated based on the timing of the push-in operation and the push-in amount of the push-in operation. If an operation involving the deformation of the ring controller is performed, the points go up to 150 points. The details of the points given in accordance with the operations on the ring controller will be described below.

As shown in (d) of FIG. 13, an image indicating the given points and an image indicating the level of the points are displayed. Examples of the image indicating the level include "Amazing", "Great", "Good", and "Bad" in accordance with the points. For example, if the points are 150 points, "Amazing" is displayed. If the points are 100 points, "Good" is displayed. Further, a representation corresponding to the given points is performed. For example, as the representation corresponding to the points, an effect image 77 is displayed, and a sound effect is also output.

As shown in FIG. 14, at another time point during the output of the music, the pull instruction sign 74 appears at the initial position ((a) of FIG. 14). The pull instruction sign 74 moves approaching the screen along a right path from the initial position in the depth direction of the screen ((b) and (c) of FIG. 14). Then, as shown in (d) of FIG. 14, at the timing when the pull instruction sign 74 reaches any of the determination areas (here, the right area 70R), an input of the user is evaluated. Here, the pull operation on the ring controller is not performed at this timing. Thus, points are "0" points, and as an image indicating the level corresponding to the points, the characters "Bad" are displayed.

As shown in FIG. 15, at yet another time point during the output of the music, the normal instruction sign 72 appears at the initial position ((a) of FIG. 15). The normal instruction sign 72 moves approaching the screen along a left path from the initial position in the depth direction of the screen ((b) and (c) of FIG. 15). Then, as shown in (d) of FIG. 15, at the timing when the normal instruction sign 72 reaches any of the determination areas (here, the left area 70L), an input of the user is evaluated. Here, the left twist operation on the ring controller is performed at this timing. Thus, "100" points are given as points, and as the level corresponding to the points, the characters "Amazing" are displayed. Even in a case where the left twist operation is continuously performed from a time before the normal instruction sign 72 reaches the determination area, "100" points are given. That is, if the left twist operation is performed (if the ring object 71 is present in the left area 70L) at the time point when the normal instruction sign 72 reaches the determination area, the same points are given in both a case where the left twist operation is performed at the moment when the normal instruction sign 72 reaches the determination area, and a case where the left twist operation is continuously performed from a time before the time point when the normal instruction sign 72 reaches the determination area. In the case of the normal instruction sign 72, a perfect score is 100 points, and in the case of the perfect score, "Amazing" is displayed as the level.

As shown in FIG. 16, at yet another time point during the output of the music, the continuous push-in instruction sign 75 may appear ((a) of FIG. 16). The continuous push-in instruction sign 75 is an image obtained by joining a plurality of images similar to that of the push-in instruction sign 73 and is an instruction sign for causing the user to continue the push-in operation. As shown in (b) of FIG. 16, while a part of the continuous push-in instruction sign 75 is displayed in any of the determination areas, and if the user continuously performs the push-in operation, points are given. Based on the timing when the pushing in is started, the time when the pushing in is continued, and the push-in amount of the push-in operation, points are given.

The continuous push-in instruction sign 75 also moves along any of the left, center, and right paths and reaches any of the left, center, and right determination areas. In a case where the ring object 71 is present in the same area as the area reached by the continuous push-in instruction sign 75, and the ring controller is continuously pushed in, points are given.

Here, in a case where the ring object 71 is present in the same area as the area reached by the continuous push-in instruction sign 75, the orientation of the ring controller may change without the user's intention. For example, if the push-in operation is continued on the ring controller, the user may change the orientation of the ring controller without their intention. In the exemplary embodiment, in a case where the continuous push-in instruction sign 75 reaches any of the determination areas, and the ring object 71 is present in the same area as the area reached by the continuous push-in instruction sign 75, and even if the orientation of the ring controller changes, the display position of the ring object 71 is not changed. That is, while the continuous push-in instruction sign 75 is present in any of the determination areas, and if the ring object 71 moves to the same area, the ring object 71 is fixed to the area, regardless of whether or not the push-in operation is performed. If the timing when the continuous push-in operation is performed elapses (i.e., if the continuous push-in instruction sign 75 ceases to be present in the determination area), the fixing of the ring object 71 is cancelled. For example, in a case where the continuous push-in instruction sign 75 is present in the right area 70R, and if the right twist operation and the push-in operation continue on the ring controller, the ring object 71 is displayed in the right area 70R, and points are given. During the continuation of the push-in operation, even if the ring controller returns to the reference orientation, or the left twist operation is performed, the ring object 71 is continuously displayed in the right area 70R, and points are given. In a case where the continuous push-in instruction sign 75 is present in the right area 70R, and if the right twist operation is performed on the ring controller, and the push-in operation is not performed, the ring object 71 is displayed in the right area 70R, but points are not given. In this case, even if the ring controller returns to the reference orientation, or the left twist operation is performed, the ring object 71 is continuously displayed in the right area 70R (points are not given). That is, in a case where the ring object 71 is present in the same area as the continuous push-in instruction sign 75, and even if the orientation of the ring controller changes after that, the ring object 71 does not move. This can prevent the ring object 71 from moving against the user's intention. In a case where the push-in operation continues, and even if the orientation of the ring object changes in the middle of the push-in operation, points can be given. In another exemplary embodiment, in a case where the ring object 71 is present in the same area as the continuous push-in instruction sign 75, and the push-in operation continues, and even if the orientation of the ring controller changes after that, the ring object 71 may not move. In this case, while the push-in operation continues, the position of the ring object 71 is fixed. If, however, the push-in operation is ended, the fixing of the position of the ring object 71 is cancelled.

(Evaluation of Input of User)

Figure 17A:
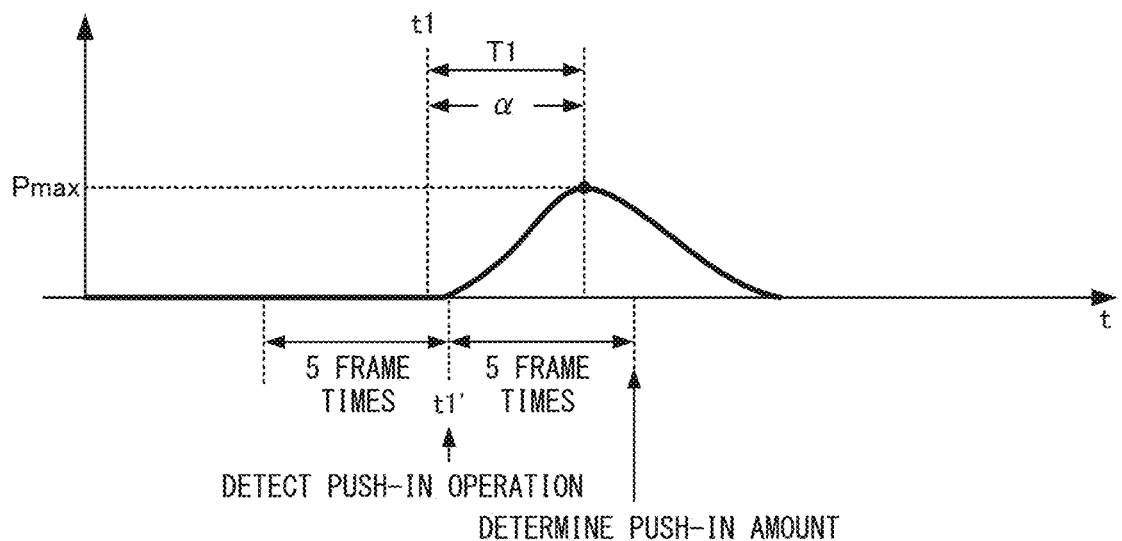
FIG. 17A is an example non-limiting diagram illustrating a method for calculating points corresponding to an input of the user and is an example non-limiting diagram showing an example of a change in a push-in amount in a case where the push-in operation is detected at a timing T1.
Figure 17B:
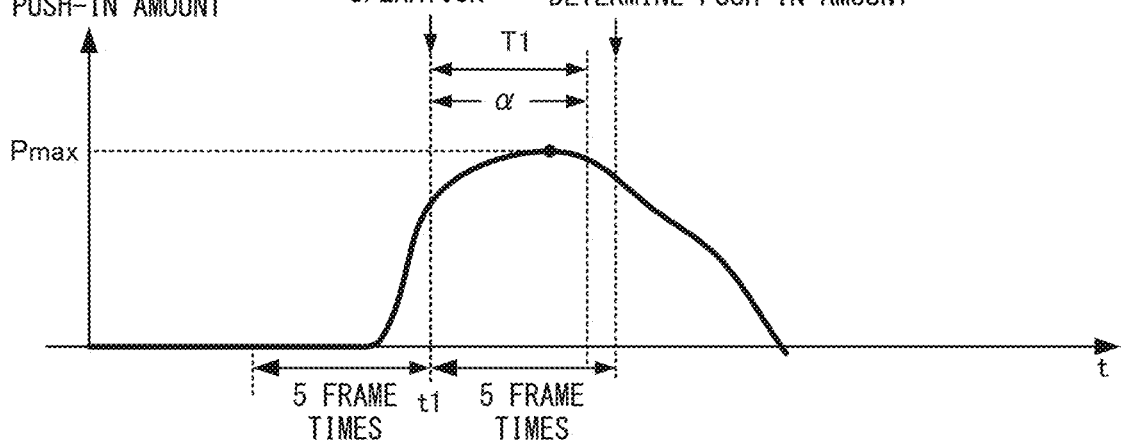
FIG. 17B is an example non-limiting diagram illustrating the method for calculating points corresponding to an input of the user and is an example non-limiting diagram showing the example of the change in the push-in amount in the case where the push-in operation is detected at the timing T1.
Figure 17C:
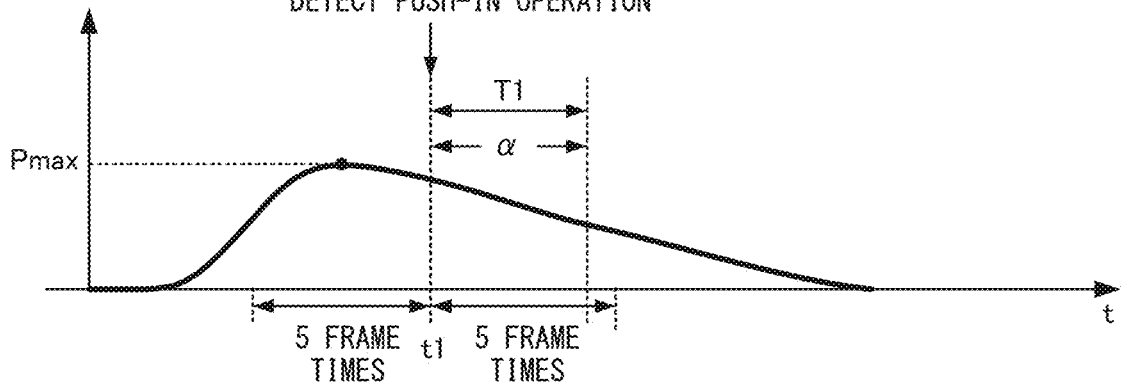
FIG. 17C is an example non-limiting diagram illustrating the method for calculating points corresponding to an input of the user and is an example non-limiting diagram showing the example of the change in the push-in amount in the case where the push-in operation is detected at the timing T1.

Next, the evaluation of an input of the user is described. FIGS. 17A to 17C are diagrams illustrating a method for calculating points corresponding to an input of the user, which are diagrams showing an example of a change in the push-in amount in a case where the push-in operation is detected at the timing T1.

In the case of an operation involving the deformation of the ring controller, the evaluation (points Z) of an input of the user is calculated based on points (X) based on the timing of the operation and points (Y) based on the deformation amount of the ring controller. In a case where the instruction sign for giving an instruction to perform the successive push-in operation (or the successive pull operation) is displayed, points are calculated based on the number of times of pushing in (or the number of times of pull).

Specifically, after the output of the music is started, at the timing T1 that is a period α from the time point t1, if the push-in amount exceeds a predetermined threshold, the push-in operation is detected. For example, as shown in FIG. 17A, at a time point t1' in the period α from the time point t1, if the push-in amount exceeds the threshold, the push-in operation is detected at the time point t1'. If the push-in operation is detected at the timing T1, the points X based on the timing are set to 100 points (a perfect score), for example.

At the time point when 5 frame times (e.g., 1 frame time=1/60 seconds) elapses from the time point t1' when the push-in operation is detected, the push-in amount is determined. Specifically, in the determination of the push-in amount, the maximum value of the deformation amount (here, the push-in amount) in 5 frame times before and after the time point t1' is calculated. Based on the maximum value of the deformation amount in these 10 frames, the points Y are calculated. The points Y are calculated out of 50 points, for example. The greater the maximum value of the deformation amount is, the closer to 50 points the points Y are. The relationship between the points Y and the maximum value of the deformation amount may be any relationship. For example, the points Y may be proportional to the maximum value of the deformation amount.

If the points Y are calculated based on the deformation amount, the evaluation (the points Z) of the input of the user at the timing T1 is calculated. Specifically, the points Z are the sum of X and Y. Thus, the points Z given when an instruction is given to perform the push-in operation are up to 150 points.

As shown in FIG. 17B, if the push-in operation is started immediately before the time point t1, it is determined whether or not the push-in amount exceeds the predetermined threshold at the time point t1. If the push-in amount exceeds the threshold, the push-in operation is detected at the time point t1. At the time point t1, the points X based on the timing are set to 100 points. At the time point when 5 frame times elapses from the time point t1 when the push-in operation is detected, the push-in amount is determined, and the points Y based on the deformation amount are calculated. Specifically, the maximum value of the deformation amount in 5 frame times before and after the time point t1 is calculated, and based on this maximum value, the points Y are calculated.

As shown in FIG. 17C, if the push-in operation is started before the time point t1, and if the push-in amount exceeds the predetermined threshold also at the time point t1, the push-in operation is detected at the time point t1. At the time point t1, the points X based on the timing are set to 100 points. At the time point when 5 frame times elapses from the time point t1 when the push-in operation is detected, the push-in amount is determined, and the points Y based on the deformation amount are calculated. The maximum value of the deformation amount in 5 frame times before and after the time point t1 is calculated, and based on this maximum value, the points Y are calculated. Even if the maximum value of the deformation amount is detected before the timing T1 (the period α), the points Y are calculated based on this maximum value.

As described above, if the push-in operation is started at the timing T1, the points X based on the timing are set to 100 points (the perfect score). Even if the push-in operation is started from a time before the timing T1, and the push-in operation continues at the timing T1, similarly to the case where the push-in operation is started at the timing T1, the points X are set to 100 points. That is, if the ring controller deforms by pushing in at the timing T1, the points X based on the timing are set to 100 points, regardless of whether or not the ring controller deforms from a time before the timing T1.

Figure 18A:
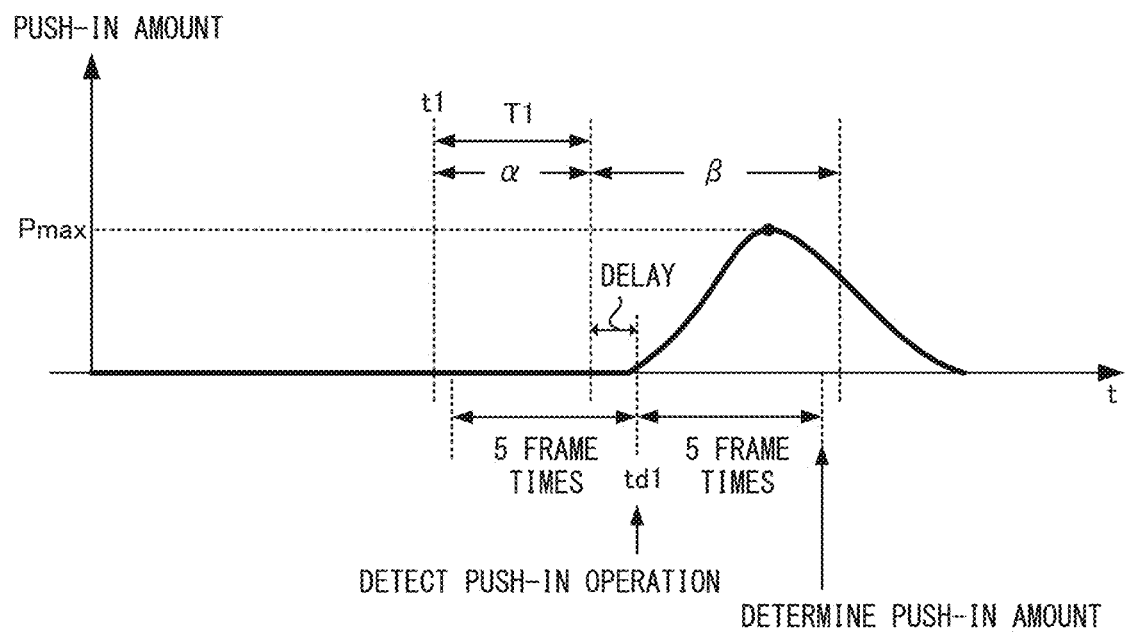
FIG. 18A is an example non-limiting diagram showing an example of a change in the push-in amount in a case where the push-in operation is detected behind the timing T1, and is an example non-limiting diagram in a case where points X based on a timing are deducted.

FIG. 18A is a diagram showing an example of a change in the push-in amount in a case where the push-in operation is detected behind the timing T1, and is a diagram in a case where the points X based on the timing are deducted.

As shown in FIG. 18A, if the push-in amount does not exceed the threshold at the timing T1, and the push-in amount exceeds the threshold in a period β after the timing T1, the push-in operation is detected at a time point td1 when the push-in amount exceeds the threshold. In accordance with the delay time between the time point td1 and the timing T1, the points X based on the timing are calculated. For example, the points X are set from 10 points to 80 points. For example, if the delay time is 1 frame time, the points X may be set to 80 points, and the points X may linearly decrease with respect to the delay time.

At the time point when 5 frame times elapses from the time point td1, the push-in amount is determined, and the points Y based on the deformation amount are calculated. Also in a case where the push-in operation is detected behind the timing T1, similarly to the case where the push-in operation is detected at the timing T1, based on the maximum value of the deformation amount in 5 frame times before and after the time point td1, the points Y are calculated. Then, as the evaluation (the points Z) of the input of the user, the sum of X and Y is calculated.

Figure 18B:
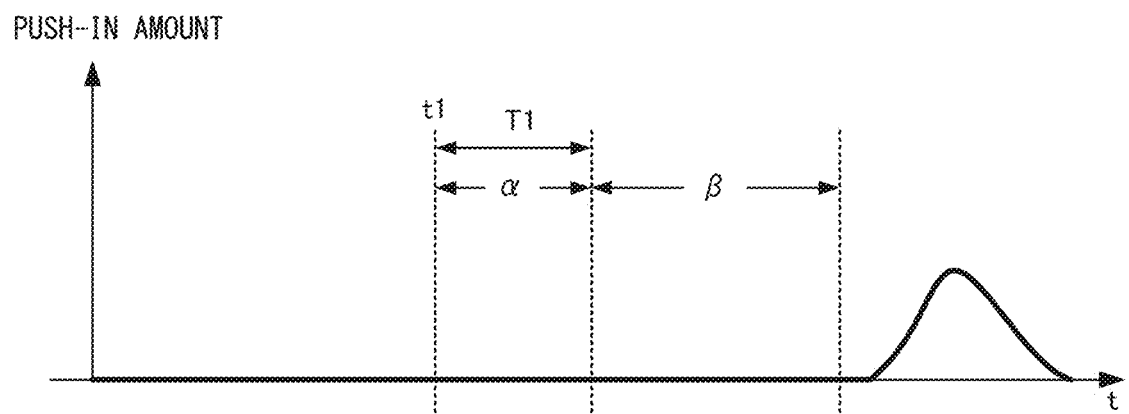
FIG. 18B is an example non-limiting diagram showing an example of a change in the push-in amount in a case where the points X based on the timing are set to zero.

FIG. 18B is a diagram showing an example of a change in the push-in amount in a case where the points X based on the timing are set to zero.

As shown in FIG. 18B, if the push-in amount does not exceed the threshold at the timing T1 (in the period α), and the push-in amount does not exceed the threshold also in the period β after the timing T1, the points X based on the timing are set to zero. Even if the push-in amount exceeds the threshold after the period β, the points X based on the timing are zero. In this case, the points Y based on the deformation amount are also zero. Thus, if the push-in amount does not exceed the threshold at the timing T1 and in the period β after the timing T1, the evaluation (the points Z) of the input of the user is zero, regardless of whether or not the push-in amount exceeds the threshold after the period β. As described above, the timing of the start of the push-in operation before the timing T1 does not influence the points X, but the timing of the start of the push-in operation after the timing T1 influences the points X.

In accordance with the value of the points Z, the evaluation of the input of the user is displayed at four levels. For example, if the points Z are from 150 points to 135 points, the evaluation "Amazing" is displayed. If the points Z are from 134 points to 110 points, the evaluation "Great" is displayed.

In addition to this display at four levels, a representation corresponding to the evaluation (the points Z) of the input of the user is performed. In the exemplary embodiment, as the representation corresponding to the evaluation, a sound effect and an effect image are output.

Specifically, at the time point when the push-in operation is detected, the output of a first sound effect is started. For example, in the case of FIG. 17A, the first sound effect is output at the time point t1'. In the cases of FIGS. 17B and 17C, the first sound effect is output at the time point t1. In the case of FIG. 18A, the first sound effect is output at the time point td1.

The first sound effect includes a first sound effect A and a first sound effect B. If the push-in operation is detected at the timing T1 (i.e., if the points X are 100 points), the first sound effect A is output. If the push-in operation is detected behind the timing T1 (i.e., if the points X are deducted from 100 points), the first sound effect B is output. The first sound effect A is a more comfortable sound to the user than the first sound effect B. For example, the first sound effect A may have a higher-pitched sound than the first sound effect B.

After the first sound effect is output, at the time point when 5 frames elapses after the push-in operation is detected (i.e., the time point when the push-in amount is determined), the output of a second sound effect is started. The second sound effect includes, for example, four types of sound effects. Specifically, examples of the second sound effect include a second sound effect A corresponding to "Amazing", a second sound effect B corresponding to "Great", a second sound effect C corresponding to "Good", and a second sound effect D corresponding to "Bad". In accordance with the points Z, any of these four types of second sound effects is selected and output. The second sound effect A is a more comfortable sound to the user than the second sound effects B to D, and for example, may be a higher-pitched sound than these sounds. The second sound effect B is a more comfortable sound to the user than the second sound effects C and D. The second sound effect C is a more comfortable sound to the user than the second sound effect D.

The first sound effect output at the time point when the push-in operation is detected and the second sound effect output 5 frame times after this time point are continuously output as a series of sound effects. For example, at the time point when the push-in operation is detected, the output of the first sound effect is started, and during the output of the first sound effect, the output of the second sound effect is started. Consequently, the first sound effect and the second sound effect sound like a single sound effect to the user.

In the exemplary embodiment, in addition to the points X based on the timing of the push-in operation, based on the push-in amount of the push-in operation, the points Y are calculated. The points Y based on the push-in amount are calculated 5 frame times after the time point when the push-in operation is detected, and the points Z are finalized. Thus, at the time point when the push-in operation is detected, a sound effect corresponding to the points Z cannot be output. In a case where the sound effect is not output at the time point when the push-in operation is detected, and the sound effect is output 5 frame times after the time point when the push-in operation is detected, the sound effect is output behind the timing of an input of the user. In this case, the user may feel uncomfortable.

Thus, in the exemplary embodiment, the first sound effect is output at the time point when the push-in operation is detected, and further, the second sound effect is output 5 frame times after this time point. The sound effects are thus output in two steps, whereby it is possible to output a sound effect in time for an input of the user and also output an appropriate sound effect corresponding to the evaluation of the input of the user. Thus, it is possible to output a sound effect corresponding to an operation without an uncomfortable feeling to the user.

Effect images are also output in two steps. That is, a first effect image is displayed at the time point when the push-in operation is detected, and a second effect image corresponding to the points Z is displayed 5 frame times after the time point when the push-in operation is detected. As the second effect image, four images corresponding to evaluations at four levels ("Amazing", "Great", "Good", and "Bad") are prepared. 5 frame times after the time point when the push-in operation is detected, any of the four second effect images is selected and displayed in accordance with the points Z. The first effect image is an image common to the evaluations at four levels. Whichever of the four second effect images is displayed after the first effect image is displayed, the second effect image is an image without an uncomfortable feeling to the user. For example, the first effect image may be a circular image. The second effect image corresponding to "Amazing" may be a large star-shaped image. The second effect image corresponding to "Great" may be a small star-shaped image. For example, at the time point when the push-in operation is detected, the circular image is displayed as the first effect image, and 5 frame times after this time point, the points Z are finalized, and the large star-shaped image is displayed as the second effect image corresponding to "Amazing". If the user views such a series of images including the first effect image and the second effect image, it looks as if the circular image changes to the large star-shaped image. Thus, as a single representation, the series of images is not uncomfortable.

The effect images are thus displayed in two steps, whereby it is possible to display an effect image in time for an input of the user and also display an appropriate effect image corresponding to the evaluation of the input of the user. Thus, it is possible to display an effect image corresponding to an evaluation without an uncomfortable feeling to the user.

In FIGS. 17A to 18B, a case has been described where an instruction is given to perform the push-in operation. Also in a case where an instruction is given to perform the pull operation, by a similar method, based on the points X based on the timing and the points Y based on the deformation amount (the pull amount), the evaluation (the points Z) of the input of the user is calculated.

On the other hand, in a case where an instruction is given to perform an operation without involving the deformation of the ring controller (the right twist operation, the left twist operation, and the operation of bringing the ring controller into the reference orientation), at the timing when the normal instruction sign 72 reaches any of the plurality of determination areas (the center area 70C, the right area 70R, and the left area 70L), an input of the user is evaluated based on whether or not the ring object 71 is located in the same area.

Figure 19:
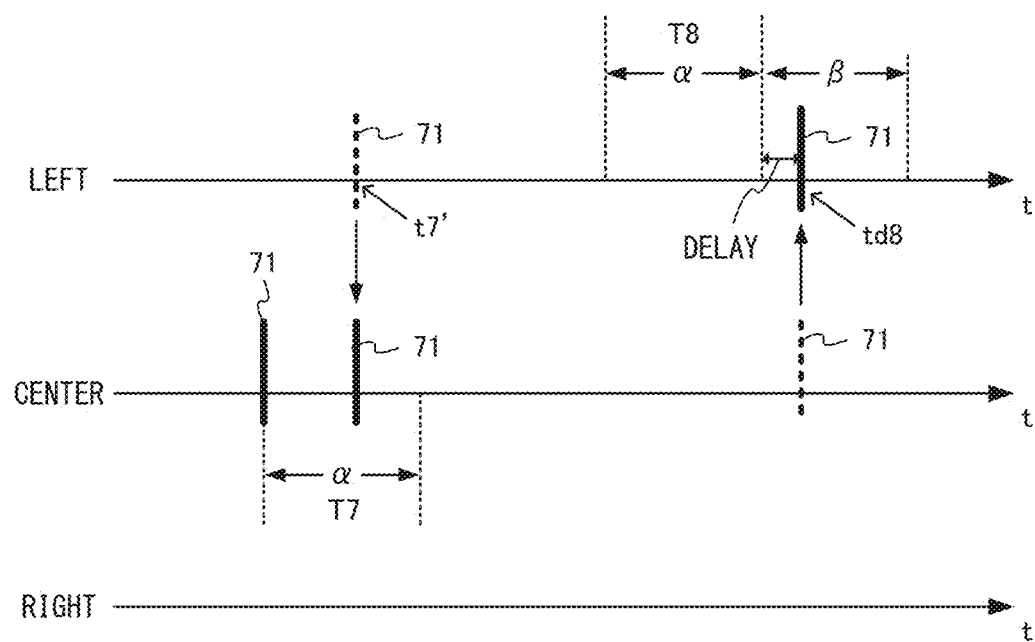
FIG. 19 is an example non-limiting diagram illustrating the evaluation of an input of the user in a case where an instruction is given to perform an operation without involving the deformation of the ring controller.

FIG. 19 is a diagram illustrating the evaluation of an input of the user in a case where an instruction is given to perform an operation without involving the deformation of the ring controller.

As shown in FIG. 19, if the normal instruction sign 72 reaches the center area 70C at a timing T7, and when the ring object 71 is located in the center area 70C at the timing T7, the points X based on the timing are set to 100 points. In a case where an instruction is given to perform an operation without involving the deformation of the ring controller, the points Y based on the deformation amount are not added. Thus, the evaluation (the points Z) of the input of the user is equal to the points X based on the timing. For example, if the ring object 71 is located in the center area 70C from a time before the timing T7, and the ring object 71 continues to be located in the center area 70C also at the timing T7, the points X are set to 100 points. For example, also if the ring object 71 moves from the left area 70L to the center area 70C at a time point t7' in the timing T7, the points X are set to 100 points.

On the other hand, for example, in a case where the normal instruction sign 72 reaches the left area 70L at a timing T8, and if the ring object 71 is not located in the left area 70L at the timing T8, the points X are deducted. For example, if the ring object 71 moves from the center area 70C to the left area 70L at a time point td8 in the period β after the timing T8, the points X are deducted in accordance with the delay time between the timing T8 and the time point td8. In this case, a method for calculating the points X is similar to the calculation method in the case where an instruction is given to perform an operation involving the deformation of the ring controller (the push-in operation or the pull operation). If the ring object 71 is not located in the left area 70L that is the area reached by the normal instruction sign 72 even in the period β, the points X are zero.

The above periods α and β are set for the time points (t1, t2, t3, . . . ) determined in advance for the music. The lengths of the periods α and β set for the time points (t1, t2, t3, . . . ) may be the same as or different from each other.

As described above, in the rhythm game according to the exemplary embodiment, at a predetermined timing set corresponding to music, an instruction is given to perform an operation involving the deformation of the ring controller. If the ring controller deforms at the predetermined timing, the points X based on the timing are set to 100 points, regardless of whether or not the ring controller deforms from a time before the predetermined timing. For example, if the state where the ring controller does not deform changes to the state where the ring controller deforms at the predetermined timing, the points X are set to 100 points. Also if the deformation of the ring controller is started before the predetermined timing, and the deformation continues at the predetermined timing, similarly, the points X are set to 100 points. If, on the other hand, the deformation of the ring controller is started after the predetermined timing, the points X are deducted from 100 points.

As described above, if the ring controller deforms at a predetermined timing, a high evaluation is given, regardless of whether or not the ring controller deforms from a time before the predetermined timing, whereby it is possible to provide an input in a rhythm game using a ring controller that deforms.

For example, in some existing rhythm game, a button operation is performed at a predetermined timing determined corresponding to music, whereby high points are given. Specifically, if the state where a button is not pressed changes to the state where the button is pressed (from OFF to ON) at a predetermined timing, high points are given. If, on the other hand, the button is pressed before the predetermined timing, and the button is in a pressed state at the predetermined timing, points are deducted. Also if the button is pressed after the predetermined timing, similarly, points are deducted.

However, in a case where an input is provided by deforming the ring controller in the rhythm game, it may be difficult for the user to provide an input as intended. In a case where the ring controller deforms by applying a certain force to the ring controller, the timing when the user applies a force to the ring controller and the timing when the deformation of the ring controller is detected may be shifted from each other. For example, even if the user applies a force to the ring controller, the ring controller may not instantaneously deform, and the deformation of the ring controller may be detected by being shifted from the timing when the user applies the force. For example, to apply a strong force, the user may push in the ring controller using a reaction. In this case, a timing intended by the user and the timing when the deformation of the ring controller is detected may be shifted from each other. In a case where an input is provided by deforming the ring controller, it may be difficult for the user to know how much the ring controller should be deformed so that the input is detected.

For such a reason, in the exemplary embodiment, regardless of whether or not the ring controller deforms from a time before a predetermined timing for music, it is determined whether or not the ring controller deforms at the predetermined timing. If the ring controller deforms at the predetermined timing, a high evaluation is given. Consequently, it is possible to use a ring controller that deforms by applying a force to the ring controller, for an input in a rhythm game.

Even if the ring controller deforms from a time before a predetermined timing, a high evaluation is given, whereby it is possible to provide the user with a motivation to do an exercise using the ring controller. For example, the user performs the push-in operation from when the push-in instruction sign 73 appears at the initial position. Then, the user continues the push-in operation until the push-in instruction sign 73 reaches any of the determination areas, whereby the user can earn high points. Consequently, it is possible to cause the user to positively exercise in a rhythm game.

Next, a description is given of the details of the timing when a determination regarding an input of the user is made and the timing when an instruction sign reaches a determination area.

Figure 20A:
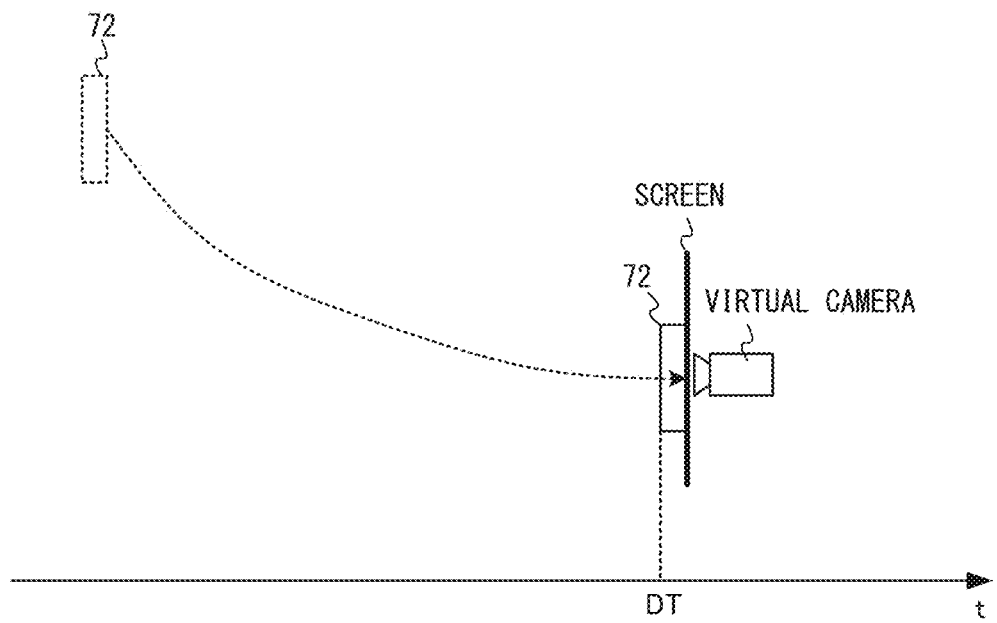
FIG. 20A is an example non-limiting diagram showing examples of the timing when a determination regarding an input of the user is made and the timing when the normal instruction sign 72 reaches a determination area.
Figure 20B:
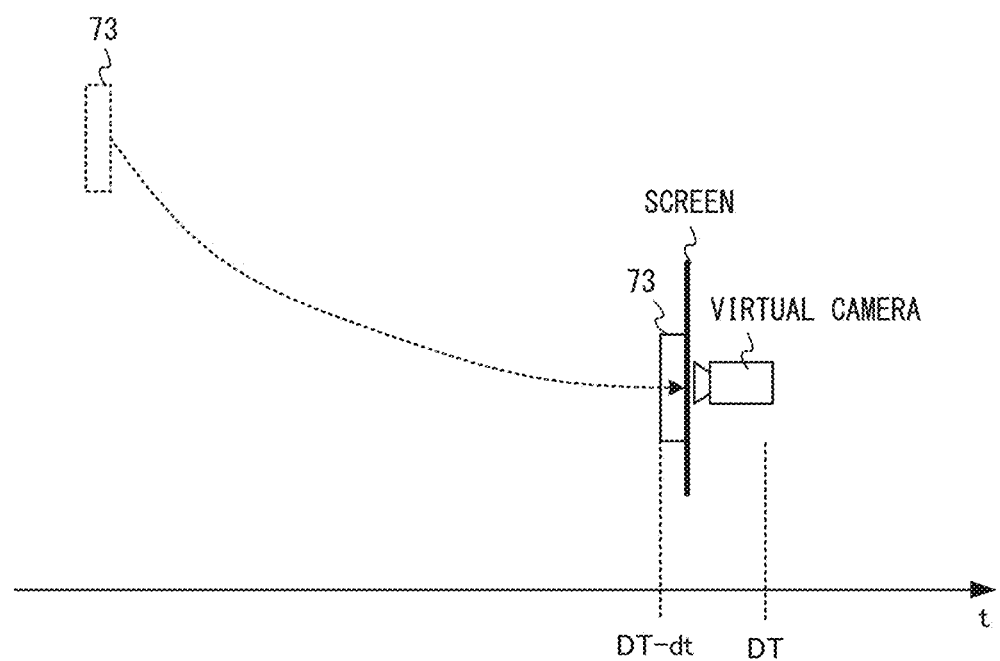
FIG. 20B is an example non-limiting diagram showing examples of the timing when a determination regarding an input of the user is made and the timing when the push-in instruction sign 73 reaches a determination area.

FIG. 20A is a diagram showing examples of the timing when a determination regarding an input of the user is made and the timing when the normal instruction sign 72 reaches any of the determination areas. FIG. 20B is a diagram showing examples of the timing when a determination regarding an input of the user is made and the timing when the push-in instruction sign 73 reaches any of the determination areas.

As shown in FIG. 20A, the normal instruction sign 72 approaches the screen in a curve from the initial position in the depth direction of the screen. At the timing when a determination regarding an input of the user is made (a determination timing DT), the normal instruction sign 72 reaches any of the determination areas. At this time, as shown in (d) of FIG. 10, the normal instruction sign 72 is displayed to be located on the screen. As described above, if the ring object 71 is present in the determination area (any of the center area 70C, the right area 70R, and the left area 70L) reached by the normal instruction sign 72 at the determination timing DT, 100 points are given as the points X based on the timing.

On the other hand, in a case where the push-in instruction sign 73 is displayed to move, as shown in FIG. 20B, at a time point a time dt before the determination timing DT, the push-in instruction sign 73 reaches any of the determination areas. For example, at a time point 2 frame times before the determination timing DT, the push-in instruction sign 73 reaches the determination area. That is, the time point when the push-in instruction sign 73 is displayed to be located on the screen is the time point the time dt before the determination timing DT. In other words, the timing when the time dt elapses after the push-in instruction sign 73 reaches the determination area is the determination timing DT. At the determination timing DT, the push-in instruction sign 73 passes by the determination area (the position of the screen). By another method, the determination timing DT and the timing when the push-in instruction sign 73 reaches the determination area may be shifted from each other. For example, the position of the push-in instruction sign 73 in the depth direction of the screen may be shifted, whereby the determination timing DT and the timing when the push-in instruction sign 73 reaches the determination area may be shifted from each other.

Figure 21:
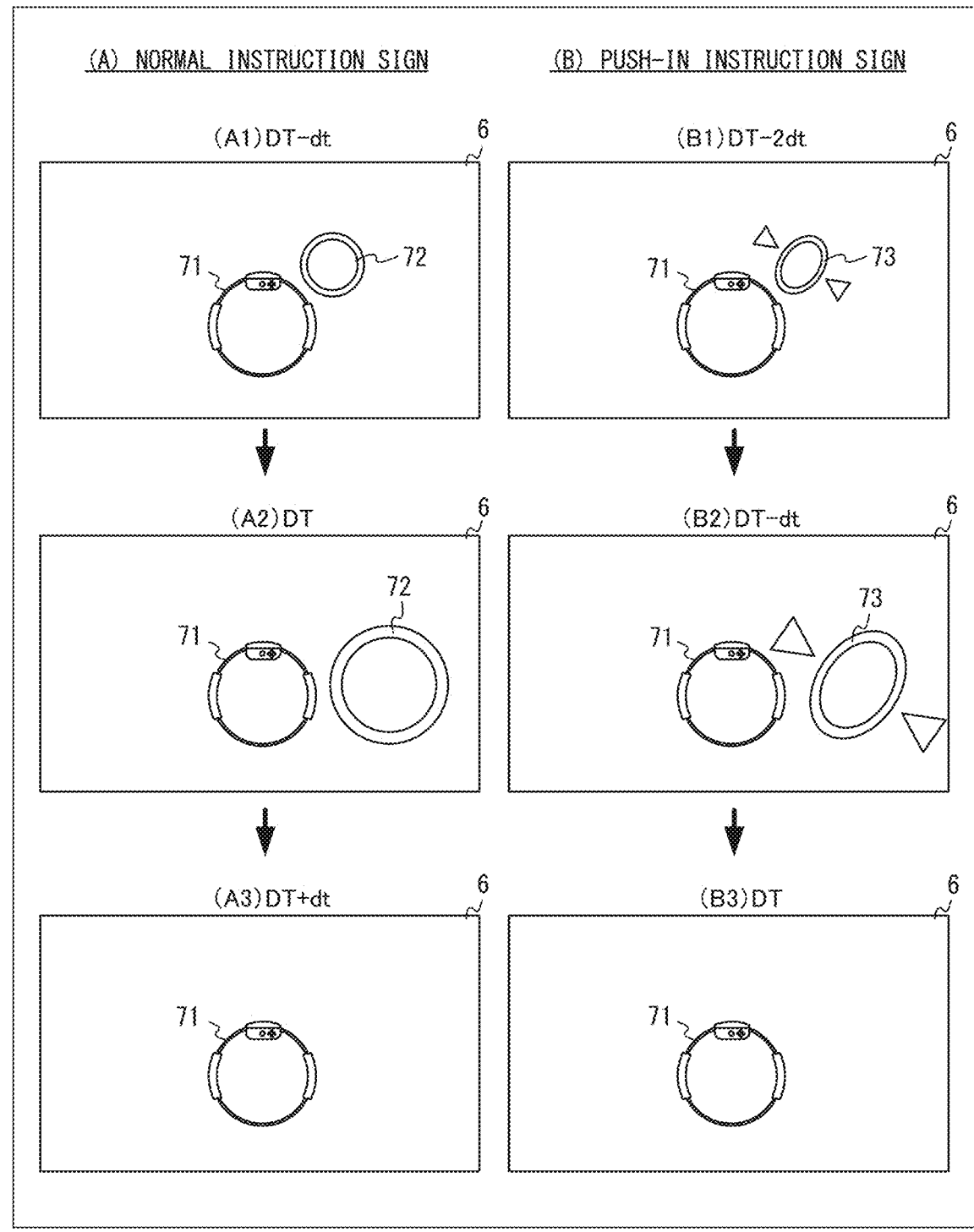
FIG. 21 is an example non-limiting diagram showing the comparison between game images in a case where the normal instruction sign is displayed, and a case where the push-in instruction sign is displayed.

FIG. 21 is a diagram showing the comparison between game images in a case where the normal instruction sign is displayed, and a case where the push-in instruction sign is displayed.

In a case where an instruction is given to perform an operation without involving the deformation of the ring controller, as shown in (A1) of FIG. 21, at a time point the time dt before the determination timing DT, the normal instruction sign 72 is located in the depth direction of the screen. At the determination timing, the normal instruction sign 72 reaches any of the determination areas ((A2) of FIG. 21). Then, at the time point when the time dt elapses from the determination timing DT, the normal instruction sign 72 passes by the screen and is located behind the screen ((A3) of FIG. 21).

On the other hand, in a case where an instruction is given to perform an operation involving the deformation of the ring controller (e.g., the push-in operation), as shown in (B1) of FIG. 21, at a time point the time 2dt before the determination timing DT, the push-in instruction sign 73 is located in the depth direction of the screen. The distance from the screen to the normal instruction sign 72 in (A1) of FIG. 21 and the distance from the screen to the push-in instruction sign 73 in (B1) of FIG. 21 are equal to each other. At a time point the time dt before the determination timing DT, the push-in instruction sign 73 reaches any of the determination areas ((B2) of FIG. 21). Then, at the determination timing DT, the push-in instruction sign 73 passes by the screen and is located behind the screen ((B3) of FIG. 21).

In the above exemplary embodiment, the description has been given on the premise that the position of the determination area in the depth direction in the virtual space and the position of the screen match each other. The position of the determination area, however, may not match the position of the screen. For example, the positions of the determination area and the ring object 71 may be placed further in the depth direction than the virtual camera (the screen) (the left direction in FIG. 20). In this case, at the moment when the instruction sign passes by the determination area, the instruction sign is still present in the image capturing range of the virtual camera and is displayed on the screen.

A case where the pull instruction sign 74 is displayed is also similar to a case where the push-in instruction sign 73 is displayed. That is, before the determination timing arrives, the pull instruction sign 74 reaches any of the determination areas.

As described above, regarding an operation without involving the deformation of the ring controller, the determination timing and the timing when the normal instruction sign 72 reaches any of the determination areas match each other. The timing when a determination regarding an input of the user is made and the timing when the normal instruction sign 72 reaches the determination area match each other, whereby the user can perform the twist operation on the ring controller at the timing when the normal instruction sign 72 reaches the determination area, and earn the points X.

On the other hand, in a case where an instruction is given to perform an operation involving the deformation of the ring controller (e.g., the push-in operation), at the timing when the push-in instruction sign 73 reaches any of the determination areas, the determination timing has not yet arrived. The timing when the time dt elapses after the push-in instruction sign 73 reaches the determination area is the determination timing when a determination regarding an input of the user is made. The reason for shifting these timings is as follows. That is, in a case where an operation involving the deformation of the ring controller is performed, the timing when the user starts applying a force to the ring controller and the timing when the deformation of the ring controller exceeds the threshold and the deformation is detected may be shifted from each other. Thus, if the user starts the push-in operation on the ring controller at the timing when the push-in instruction sign 73 reaches the determination area, the timing when the push-in operation is detected may be delayed. Thus, before the actual determination timing, the push-in instruction sign 73 is caused to reach the determination area. Consequently, if the user performs the push-in operation at the timing the push-in instruction sign 73 reaches the determination area, the determination timing and the timing when the push-in amount exceeds the threshold are likely to match each other.

In a case where an input is provided, for example, using a button instead of providing an input by deforming the ring controller, the user presses the button at an intended timing and thereby can provide the input. However, in a case where an input is provided using a ring controller that deforms by applying a certain force to the ring controller, it may be difficult for the user to know how much force should be applied to the ring controller so that the deformation of the ring controller is detected as an input. Thus, the timing of an input intended by the user and the timing when an input is actually detected may be shifted from each other.

Thus, in the rhythm game according to the exemplary embodiment, in a case where an input is provided by deforming the ring controller as in the push-in operation or the pull operation, the instruction sign is caused to reach any of the determination areas before the determination timing when it is determined whether or not the actual input is provided. Consequently, it is possible to prevent the timing when an input is detected from being delayed. Thus, it is possible to provide an input at a timing intended by the user.

In a case where the continuous push-in instruction sign 75 is displayed, or in a case where the continuous pull instruction sign is displayed, similarly to the normal instruction sign 72, the determination timing and the timing when the instruction sign reaches any of the determination areas match each other. Also in a case where the continuous push-in instruction sign 75 is displayed, or in a case where the continuous pull instruction sign is displayed, similarly to the case where the push-in instruction sign 73 is displayed, the instruction sign may reach any of the determination areas before the determination timing arrives.

In the above description, the timing when the instruction sign reaches any of the determination areas is 2 frame times before the determination timing. The shifting between these timings is merely an example. For example, if the moving velocity of the instruction sign is fast, the timing when the instruction sign reaches any of the determination areas may be 3 or more frame times before the determination timing. If the moving velocity of the instruction sign is slow, the timing when the instruction sign reaches any of the determination areas may be 1 frame time before the determination timing.

In the exemplary embodiment, the instruction sign is displayed to move in the near direction from the depth direction of the screen. Consequently, even if the determination timing and the timing when the instruction sign reaches any of the determination areas are shifted from each other, it is possible to avoid giving an uncomfortable feeling to the user. Normally, in a rhythm game, it is also possible that an instruction sign is moved two-dimensionally in a left-right direction or an up-down direction of a screen. That is, it is possible that a game space is two-dimensional, and the instruction sign is moved in the two-dimensional game space. In such a case where the instruction sign moves two-dimensionally, a user clearly recognizes whether or not the instruction sign reaches a determination area. In a case where the instruction sign moves two-dimensionally, and if the timing when the instruction sign reaches the determination area and the determination timing are shifted from each other, the user may clearly recognize the shift, and this may give an uncomfortable feeling to the user. In the rhythm game according to the exemplary embodiment, however, the instruction sign is moved in the near direction from a position in the depth direction in a three-dimensional space. Thus, even if the determination timing and the timing when the instruction sign reaches any of the determination areas are shifted from each other, it is possible to avoid giving an uncomfortable feeling to the user.

(Input Using Leg Controller)

Figure 22:
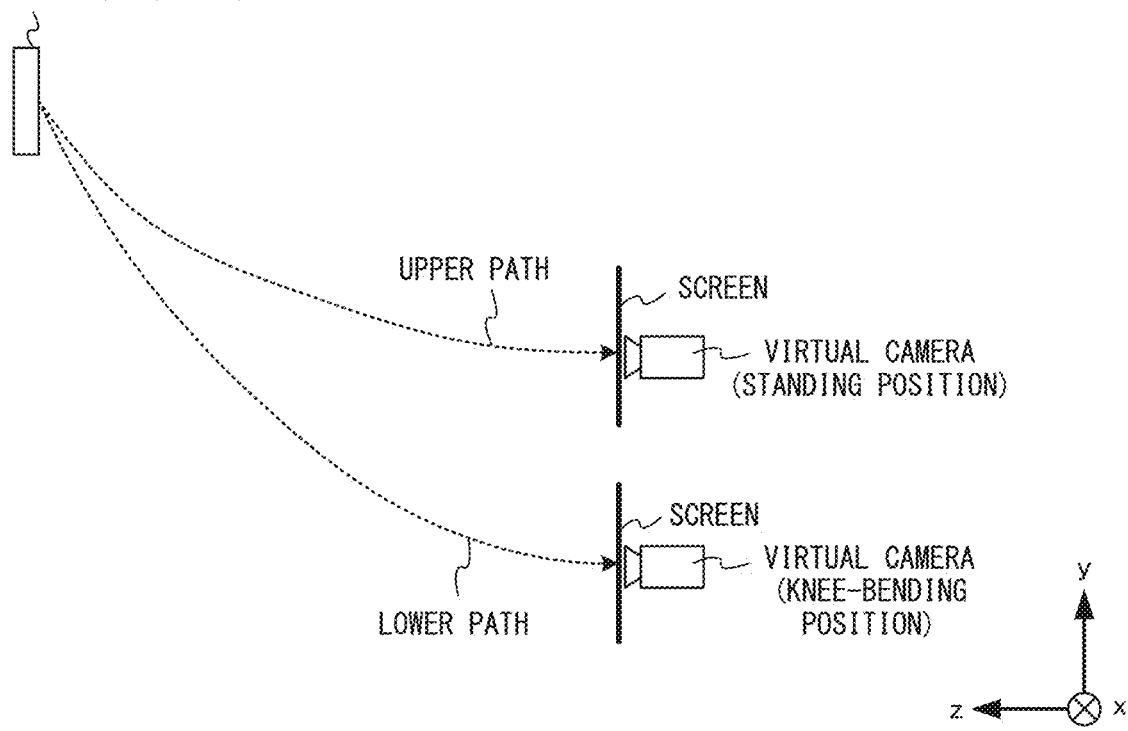
FIG. 22 is an example non-limiting diagram showing an example of upper and lower movement paths of an instruction sign and is an example non-limiting diagram viewing the state where the instruction sign moves from the horizontal direction in the virtual space.

Next, an input using the leg controller is described. In the rhythm game according to the exemplary embodiment, an instruction sign moves along either of an upper path and a lower path in the virtual space. FIG. 22 is a diagram showing examples of the upper and lower movement paths of the instruction sign and is a diagram viewing from the horizontal direction in the virtual space the state where the instruction sign moves.

As shown in FIG. 22, the instruction sign moves along either of the upper path and the lower path. In a case where the user is in a standing position, the virtual camera is located on the upper side. In a case where the user is in a knee-bending position (e.g., a position where the user bends their knees by 90 degrees), the virtual camera is located on the lower side. In a case where the instruction sign moves along the upper path, the user waits for the instruction sign to move to any of the determination areas (on the screen) in the standing position. At the timing when the instruction sign reaches the determination area (or before the instruction sign reaches the determination area), the user performs the operation on the ring controller. On the other hand, in a case where the instruction sign moves along the lower path, the user needs to bend their knees at least at the timing when the instruction sign reaches any of the determination areas. In a case where the instruction sign moves along the lower path, and if the user is in the knee-bending position, the user performs the operation on the ring controller at the timing when the instruction sign reaches the determination area, whereby the user can earn points. In a case where the instruction sign moves along the lower path, and if the user remains in the standing position, the instruction sign passes through the lower side of the user, and the user cannot earn points.

Figure 23:
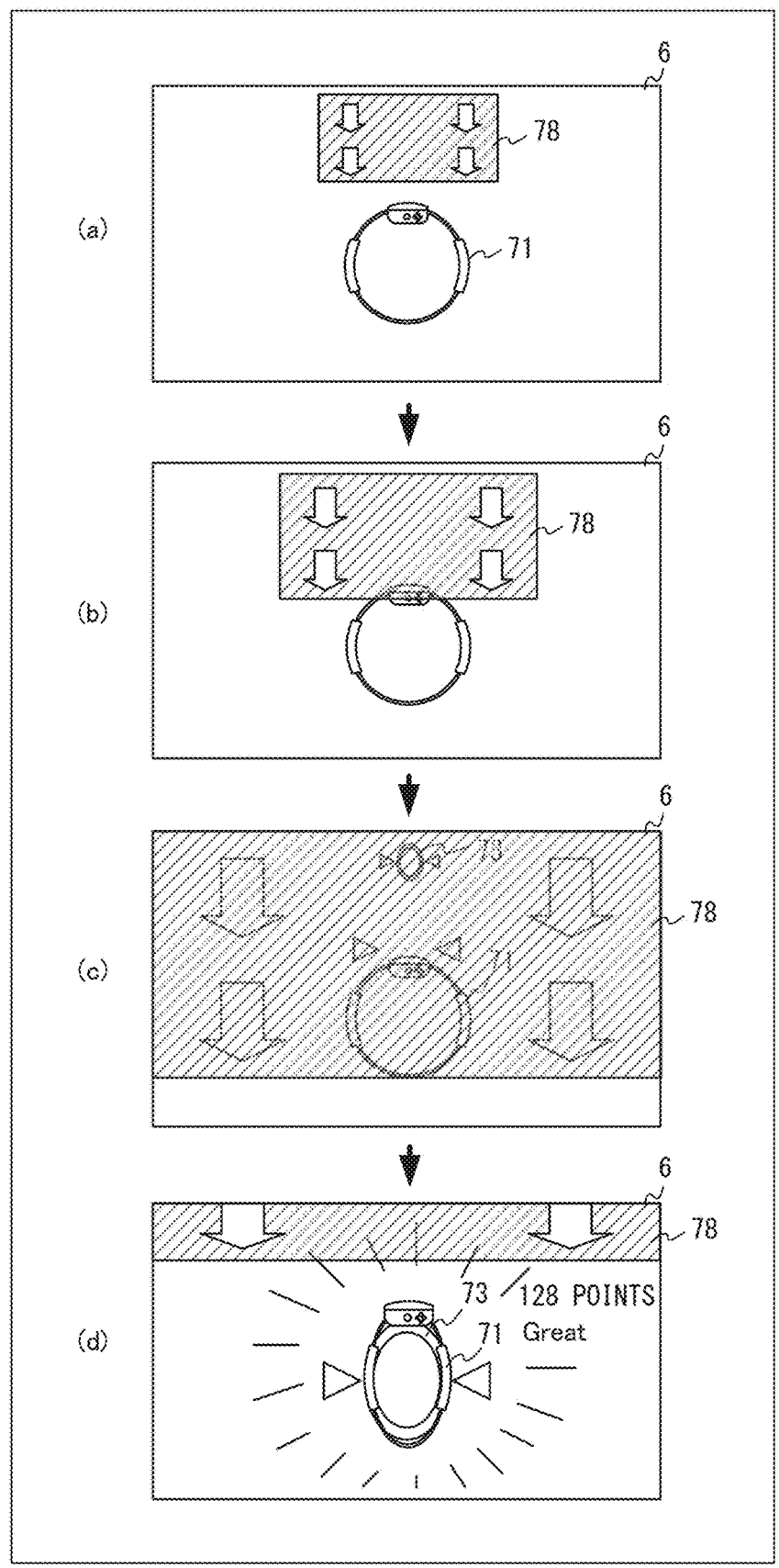
FIG. 23 is an example non-limiting diagram showing an example of a game image displayed during the execution of the rhythm game and is an example non-limiting diagram showing an example of a game image when the instruction sign passes through the lower path.

FIG. 23 is a diagram showing an example of a game image displayed during the execution of the rhythm game and is a diagram showing an example of a game image when the instruction sign passes through the lower path.

Normally, the instruction sign passes through the upper path, and the user provides a user input in the standing position. If the user is in the standing position, the virtual camera is located on the upper side, and the ring object 71 is located in an upper area (in (a) of FIG. 23). During the execution of the rhythm game, the path through which the instruction sign passes may switch from the upper path to the lower path. If the path through which the instruction sign passes switches from the upper path to the lower path, as shown in (a) of FIG. 23, a wall object 78 appears from a predetermined position in the depth direction of the screen. The wall object 78 is an object for instructing the user to bend their knees. For example, the wall object 78 is a semi-transparent image and includes images of downward arrows. As shown in (b) of FIG. 23, the wall object 78 moves in the near direction of the screen. If the wall object 78 reaches the position of the screen, as shown in (c) of FIG. 23, the wall object 78 sticks to the screen. This state indicates that the user needs to bend their knees. In this state, the push-in instruction sign 73 having appeared in the depth direction of the screen is difficult to visually confirm due to the wall object 78 stuck to the screen. If the user bends their knees in this state, the virtual camera moves to the lower side, and the ring object 71 moves to a lower area. As shown in (d) of FIG. 23, only a part of the wall object 78 stuck to the screen is displayed in the upper area of the screen, and the push-in instruction sign 73 is easy to visually confirm. Then, if the push-in operation is performed at the timing when the push-in instruction sign 73 reaches the screen (any of the determination areas), points are earned.

During the execution of the rhythm game, the path through which the instruction sign passes may switch from the lower path to the upper path. In this case, a wall object for instructing the user to stand appears. The wall object includes images of upward arrows.

As described above, in the rhythm game according to the exemplary embodiment, the instruction sign moves along any of six paths (left, center, and right paths in the upper path and left, center, and right paths in the lower path) to any of the determination areas. The user moves the ring object 71 to any of the three areas, namely the left, center, and right areas, by the twist operation on the ring controller and also moves the ring object 71 to the upper area or the lower area of the screen by stretching or bending their knees. At the timing when the instruction sign reaches the determination area, the user locates the ring object 71 in the area reached by the instruction sign and also performs on the ring controller an operation for which an instruction is given by the instruction sign, and thereby can earn points.

Consequently, the user can perform a rhythm game in accordance with the rhythm of music and do an exercise using their hands and legs.

(Details of Processing) Next, an example of processing performed by the main body apparatus 2 is specifically described. First, data stored in the main body apparatus 2 is described.

Figure 24:
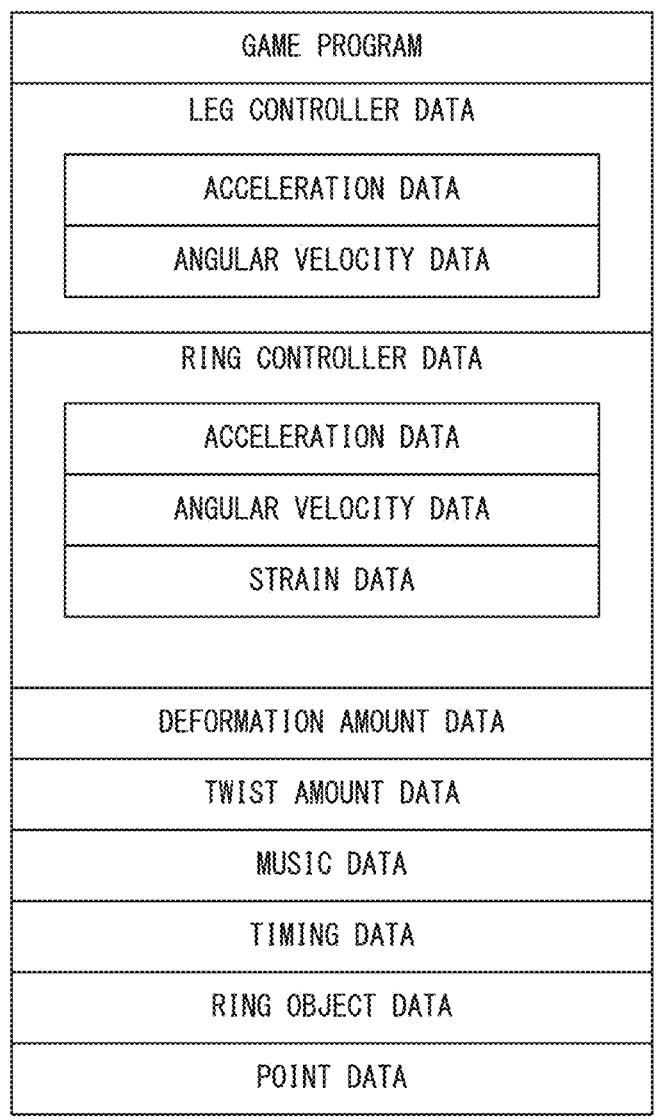
FIG. 24 is an example non-limiting diagram showing an example of data stored in the main body apparatus 2.

FIG. 24 is a diagram showing an example of the data stored in the main body apparatus 2. The data shown in FIG. 24 is mainly stored in the DRAM 85. Alternatively, a part or all of the data may be stored in the flash memory 84, or may be stored in the external storage medium attached to the slot 23.

As shown in FIG. 24, in the main body apparatus 2, a game program, leg controller data, ring controller data, deformation amount data, twist amount data, music data, timing data, ring object data, and point data are stored. In addition to these pieces of data, various pieces of data necessary for game processing, such as image data, are stored.

The game program is a program for executing the rhythm game according to the exemplary embodiment and is a program for executing processes shown in flow charts described below. For example, the game program is stored in an external storage medium or the flash memory 84. When the game is started, the game program is loaded from the external storage medium or the flash memory 84 into the DRAM 85. The game program may be acquired from another apparatus via a network (e.g., a LAN, a WAN, the Internet, or the like).

The leg controller data is sensor data transmitted from the left controller 3 at predetermined time intervals (e.g., 1/200-second intervals). Specifically, the leg controller data includes acceleration data from the acceleration sensor 104 and angular velocity data from the angular velocity sensor 105. The leg controller data includes the latest sensor data and a plurality of pieces of sensor data received in the past.

The ring controller data is sensor data transmitted from the right controller 4 at predetermined time intervals (e.g., 1/200-second intervals). Specifically, the ring controller data includes acceleration data from the acceleration sensor 114, angular velocity data from the angular velocity sensor 115, and strain data regarding the strain value detected by the strain detector 211. The ring controller data includes the latest sensor data and a plurality of pieces of sensor data received in the past.

The deformation amount data is data regarding the deformation amount of the ring controller and is data representing the push-in amount or the pull amount. The deformation amount data may be strain data acquired from the ring controller, or may be data obtained by performing a predetermined calculation on the strain data.

The twist amount data is data regarding the orientation of the ring controller calculated based on angular velocity data and/or acceleration data acquired from the ring controller. Specifically, the twist amount data is data indicating the twist amount (the rotational angle about the z-axis) of the ring controller.

The music data is data regarding music (a composition) output during the execution of the rhythm game. In the exemplary embodiment, a plurality of pieces of music data are prepared in advance. The timing data is data indicating the timing when an input of the user is evaluated. The timing data is prepared in advance in accordance with the music data.

The ring object data is data regarding the ring object 71. The ring object data includes image data of the ring object 71 and data indicating the position of the ring object 71. As described above, the position of the ring object 71 is set to any of the six areas (the left, center, and right areas in the upper area and the left, center, and right areas in the lower area) in accordance with operations on the ring controller and the leg controller.

The point data is data indicating the sum of points earned by the user during the output of music in the current rhythm game. The point data is initialized when the rhythm game is started, and points are added in accordance with an input of the user during the output of music.

(Description of Flow Charts)

Figure 25:
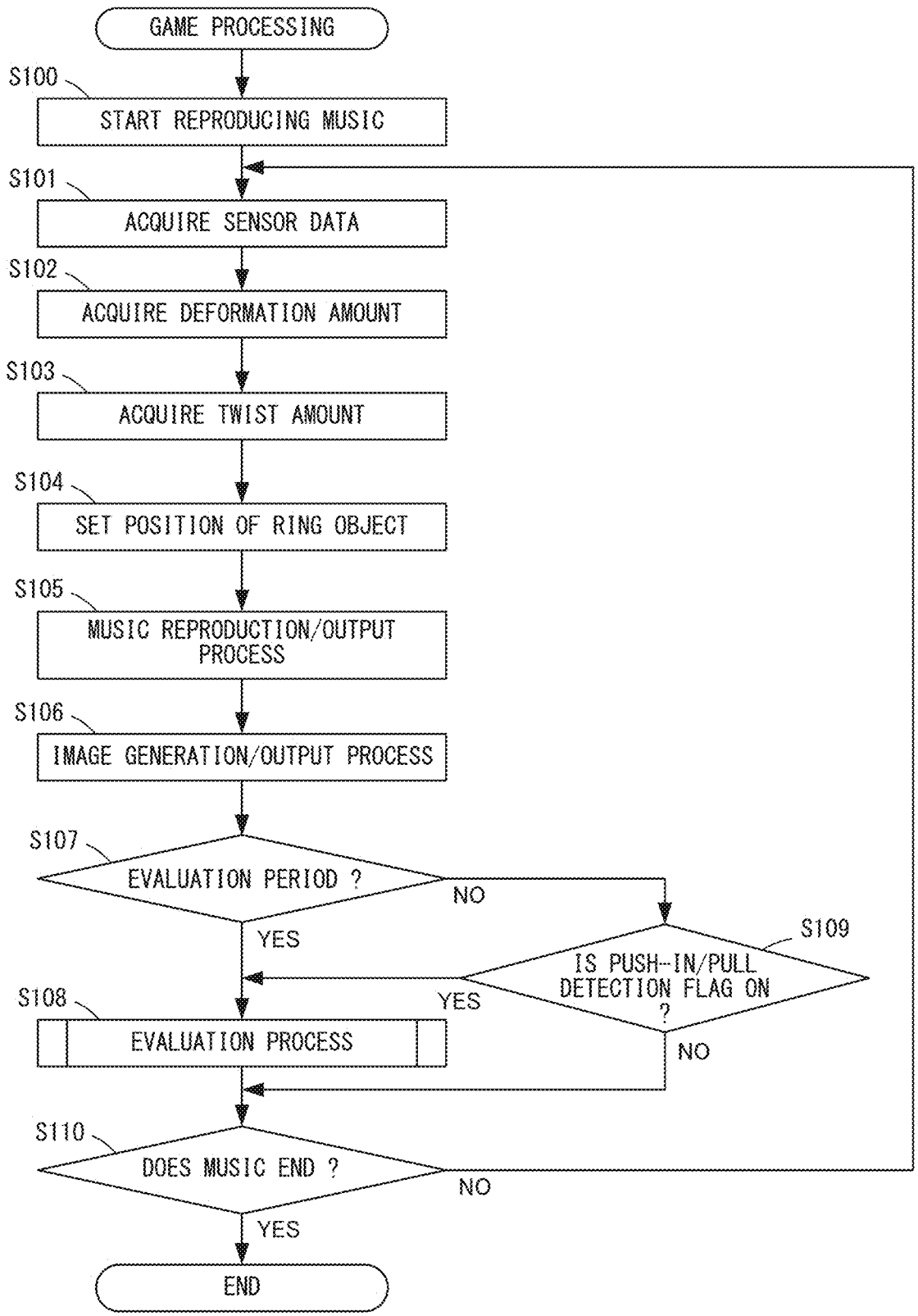
FIG. 25 is an example non-limiting flow chart showing an example of game processing performed by a processor 81 of the main body apparatus 2.

Next, the details of processing performed by the main body apparatus 2 are described. FIG. 25 is a flow chart showing an example of game processing performed by the processor 81 of the main body apparatus 2.

In step S100, the processor 81 selects any of the plurality of pieces of music data and starts reproducing the selected music data. After the processor 81 starts reproducing the music in step S100, the processor 81 repeatedly executes the processes of steps S101 to S110 at predetermined frame time (e.g., 1/60-second) intervals until the music ends (or until an instruction is given to end the game). The processes of step S101 and the subsequent steps are described below.

In step S101, the processor 81 acquires sensor data from the ring controller (acceleration data, angular velocity data, and strain data) and sensor data from the leg controller (acceleration data and angular velocity data).

In step S102, based on the acquired strain data, the processor 81 acquires the deformation amount (the push-in amount or the pull amount) of the ring controller.

In step S103, based on the angular velocity data and the acceleration data from the ring controller, the processor 81 acquires the twist amount. Specifically, based on the angular velocity data and the acceleration data, the processor 81 calculates the orientation of the ring controller and calculates the rotational angle about the z-axis (see FIG. 9) as the twist amount.

In step S104, the processor 81 sets the position of the ring object 71. Specifically, based on the twist amount, the processor 81 sets the position of the ring object 71 to any of the left, the center, and the right. Based on the sensor data from the leg controller, the processor 81 also sets the position of the ring object 71 to the upper area or the lower area. Specifically, based on the sensor data from the leg controller, the processor 81 determines whether the user is in a standing position or a knee-bending position. If the user is in the standing position, the processor 81 sets the position of the ring object 71 to the upper area. If the user is in the knee-bending position, the processor 81 sets the position of the ring object 71 to the lower area. If the position of the ring object 71 is fixed in step S115 described below, in step S104, the position of the ring object 71 does not change in accordance with the orientation of the ring controller and the orientation of the user.

In step S105, the processor 81 performs a music reproduction/output process. Specifically, the processor 81 advances the reproduction position of the music started in step S100 by 1 frame time. The process of step S105 is repeatedly performed at predetermined frame time intervals, whereby the reproduction position of the music data is updated, and the music is output from a speaker (the speakers 88 of the main body apparatus 2 or another speaker).

In step S106, the processor 81 performs an image generation/output process. Specifically, in accordance with the time elapsed after the reproduction of the music is started, the processor 81 causes an instruction sign to appear in the virtual space or move the instruction sign present in the virtual space along a predetermined path. Then, based on the virtual camera, the processor 81 generates an image of the virtual space and outputs the generated image to the monitor 6. The process of step S106 is repeatedly performed at predetermined frame time intervals, whereby, for example, the state where the instruction sign moves in the near direction from the depth direction of the screen is displayed on the monitor 6.

Next, in step S107, based on the time elapsed after the reproduction of the music is started and the timing data, the processor 81 determines whether or not the current time is an evaluation period. The "evaluation period" as used herein is a period including a time point (t1, t2, t3, . . . , t10 shown in FIG. 11) determined in advance in the music that is being output, and is a period when an input of the user is evaluated. Specifically, for example, the evaluation period is a period including the period α (the timing T1) and the period β in FIG. 18A. That is, in step S107, it is determined whether or not the current time is in the period α+β from the time points (t1, t2, t3, . . . , t10) determined in advance in the music. In this evaluation period, the movement of the instruction sign is controlled so that the instruction sign reaches any of the determination areas (on the screen).

If it is determined that the current time is the evaluation period (step S107: YES), next, the processor 81 executes the process of step S108. If, on the other hand, it is determined that the current time is not the evaluation period (step S107: NO), in step S109, the processor 81 determines whether or not a push-in detection flag (or a pull detection flag) described below is ON. If the push-in detection flag (or the pull detection flag) is ON (step S109: YES), next, the processor 81 executes the process of step S108. If the push-in detection flag (or the pull detection flag) is OFF (step S109: NO), next, the processor 81 executes the process of step S110.

In step S108, the processor 81 performs an evaluation process. The evaluation process is a process for evaluating an input of the user. In the evaluation process, points corresponding to an input of the user in the current evaluation period are calculated. The details of the evaluation process will be described below.

If the evaluation process is executed, in step S110, the processor 81 determines whether or not the music ends. If the music ends (step S110: YES), the processor 81 ends the processing shown in FIG. 25. If, on the other hand, the music does not end (step S110: NO), the processing of the processor 81 returns to step S101.

(Evaluation Process)

Figure 26:
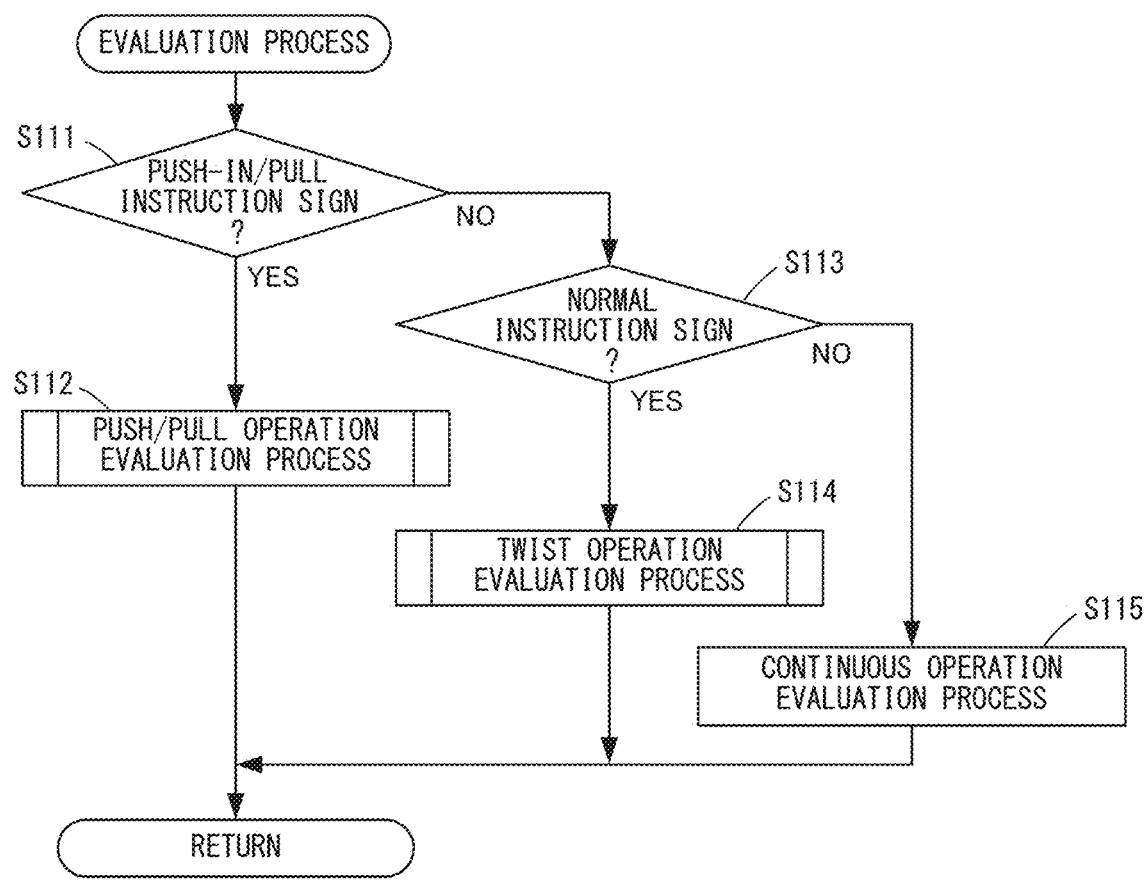
FIG. 26 is an example non-limiting flow chart showing an example of an evaluation process in step S108 in FIG. 25.

FIG. 26 is a flow chart showing an example of the evaluation process in step S108 in FIG. 25.

In step S111, the processor 81 determines whether or not the instruction sign having reached any of the determination areas is the push-in instruction sign 73 or the pull instruction sign 74.

If the instruction sign having reached the determination area is the push-in instruction sign 73 or the pull instruction sign 74 (step S111: YES), next, the processor 81 executes the process of step S112. If, on the other hand, the instruction sign having reached the determination area is neither of the push-in instruction sign 73 and the pull instruction sign 74 (step S111: NO), next, the processor 81 executes the process of step S113.

In step S112, the processor 81 performs a push/pull operation evaluation process for evaluating the push-in operation or the pull operation. The details of the push/pull operation evaluation process will be described below.

On the other hand, in step S113, the processor 81 determines whether or not the instruction sign having reached the determination area is the normal instruction sign 72.

If the instruction sign having reached the determination area is the normal instruction sign 72 (step S113: YES), next, the processor 81 executes the process of step S114. If, on the other hand, the instruction sign having reached the determination area is not the normal instruction sign 72 (step S113: NO), next, the processor 81 executes the process of step S115.

In step S114, the processor 81 performs a twist operation evaluation process for evaluating the twist operation. The details of the twist operation evaluation process will be described below.

In step S115, the processor 81 performs a continuous operation evaluation process corresponding to the continuous push-in instruction sign 75 or the continuous pull instruction sign. For example, in a case where the continuous push-in instruction sign 75 is present in the determination area, and in a case where the ring object 71 is present in the same area as the continuous push-in instruction sign 75, and the push-in operation is performed, points are given. In a case where the ring object 71 is present in the same area as the continuous push-in instruction sign 75, the processor 81 fixes the position of the ring object 71. Consequently, even if the twist amount of the ring controller changes, the ring object 71 continues to be located in the same area as the continuous push-in instruction sign 75. If the continuous push-in instruction sign 75 passes through the determination area, the processor 81 cancels the fixing of the position of the ring object 71. The same applies to a case where the continuous pull instruction sign is present in the determination area.

Specifically, in step S115, similarly to the push/pull operation evaluation process described below, the processor 81 calculates the points X based on the timing and the points Y based on the deformation amount and calculates points for the current operation. In the continuous operation evaluation process, in accordance with the time in which the push-in operation or the pull operation continues, points are calculated. If the push-in operation or the pull operation is continuously performed, high points are calculated. If the push-in operation or the pull operation is not continuously performed, low points are calculated. If the push-in operation or the pull operation is continuously performed while the continuous push-in instruction sign 75 or the continuous pull instruction sign is displayed in the determination area, certain points may be added every time several frame times elapses, thereby calculating the points Z. The time intervals at which these certain points are added may change in accordance with the deformation amount. For example, if the deformation amount of the ring controller is great (if the push-in or pull operation is performed with a strong force), the time intervals may be shortened. If the deformation amount of the ring controller is small, the time intervals may be lengthened. In this case, if the push-in operation or the pull operation is performed with a strong force for a long time as a result, high points are given as the evaluation of the operation.

(Push/Pull Operation Evaluation Process)

Figure 27:
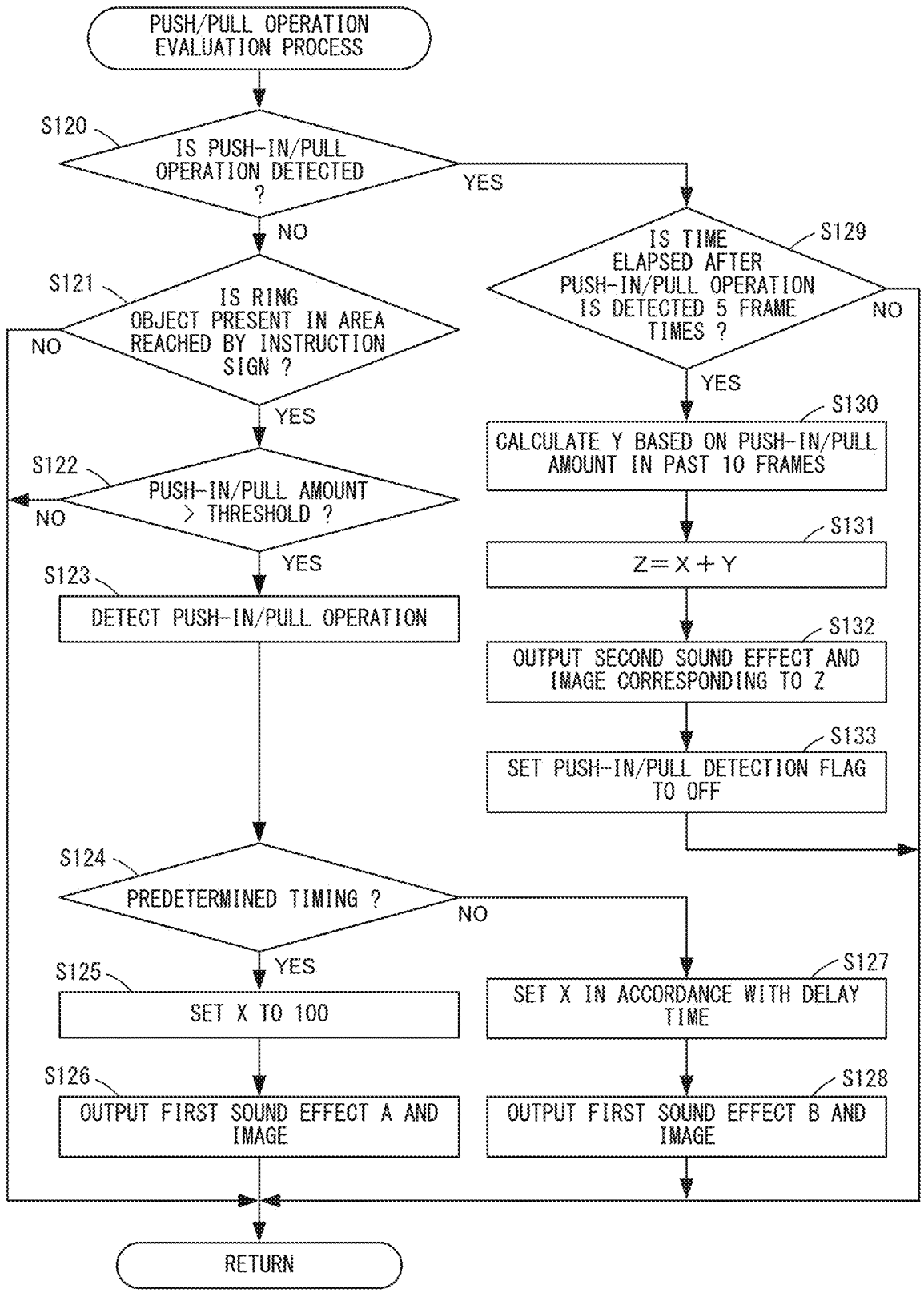
FIG. 27 is an example non-limiting flow chart showing an example of a push/pull operation evaluation process in step S112 in FIG. 26.

Next, the details of the push/pull operation evaluation process in step S112 in FIG. 26 are described. FIG. 27 is a flow chart showing an example of the push/pull operation evaluation process in step S112 in FIG. 26.

The push/pull operation evaluation process shown in FIG. 27 is a process for evaluating the push-in operation or the pull operation for which an instruction is given by the instruction sign in the current evaluation period. In the following description, a case is described where an instruction is given to perform the push-in operation in the current evaluation period (i.e., the push-in instruction sign 73 reaches the determination area).

In step S120, the processor 81 determines whether or not the push-in operation is detected. Specifically, in the current evaluation period, the processor 81 determines whether or not the push-in operation is detected in step S123 described below.

If the push-in operation is not detected (step S120: NO), next, the processor 81 executes the process of step S121. If the push-in operation is detected (step S120: YES), next, the processor 81 executes the process of step S129.

In step S121, the processor 81 determines whether or not the ring object is present in the area reached by the instruction sign. For example, in the current evaluation period, if the instruction sign reaches the left area 70L in the upper area, the processor 81 determines whether or not the ring object 71 is currently present in the left area 70L in the upper area. If the ring object is present in the area reached by the instruction sign (step S121: YES), the processor 81 executes the process of step S122. If, on the other hand, the ring object is not present in the area reached by the instruction sign (step S121: NO), the processor 81 ends the processing in FIG. 27, and the processing returns to FIG. 26.

In step S122, the processor 81 determines whether or not the current push-in amount acquired in step S102 exceeds a threshold. If the push-in amount exceeds the threshold (step S122: YES), the processor 81 executes the process of step S123. If, on the other hand, the push-in amount does not exceed the threshold (step S122: NO), the processor 81 ends the processing in FIG. 27, and the processing returns to FIG. 26.

In step S123, the processor 81 detects the push-in operation. For example, the processor 81 sets the push-in detection flag indicating that the push-in operation is detected in the current evaluation period, to ON.

In step S124, based on the time elapsed after the reproduction of the music is started and the timing data, the processor 81 determines whether or not the current time is a predetermined timing. Specifically, the processor 81 determines whether or not the current time is in the period α (the timing T1, T2, T3, or the like) from a time point (t1, t2, t3, or the like) determined in advance.

If the current time is the predetermined timing (step S124: YES), next, the processor 81 executes the process of step S125. If, on the other hand, the current time is not the predetermined timing (step S124: NO), i.e., if the current time is in the period β behind the predetermined timing (the period α), next, the processor 81 executes the process of step S127.

In step S125, the processor 81 sets the points X based on the timing to "100".

Next, in step S126, the processor 81 outputs the first sound effect A and displays on the monitor 6 the first effect image indicating that the push-in operation is performed at the predetermined timing.

On the other hand, in step S127, in accordance with the delay time, the processor 81 sets the points X based on the timing. Specifically, in accordance with the time after the period α elapses, the processor 81 linearly decreases X.

Next, in step S128, the processor 81 outputs the first sound effect B and displays on the monitor 6 the first effect image indicating that the push-in operation is performed behind the predetermined timing.

If, on the other hand, the push-in operation is detected (step S120: YES), next, the processor 81 executes the process of step S129.

In step S129, the processor 81 determines whether or not the time elapsed after the push-in operation is detected is 5 frame times. If it is determined that the time elapsed after the push-in operation is detected is 5 frame times (step S129: YES), next, the processor 81 performs the process of step S130. If it is determined that the time elapsed after the push-in operation is detected is not 5 frame times (step S129: NO), the processor 81 ends the processing in FIG. 27, and the processing returns to FIG. 26.

In step S130, based on the push-in amount in the past 10 frames, the processor 81 calculates the points Y. Specifically, the processor 81 acquires the maximum push-in amount in the past 10 frames from the current moment, and based on the maximum push-in amount, calculates the points Y. The greater the maximum push-in amount is, the higher the points Y are.

Next, in step S131, the processor 81 adds the points Y calculated in step S130 to the points X set in step S125 or step S127, thereby calculating the points Z to be given in the current evaluation period. In step S131, the processor 81 adds the calculated points Z to the point data and stores the point data in the DRAM 85.

In step S132, the processor 81 outputs the second sound effect corresponding to the value of Z. The processor 81 displays an image corresponding to the value of Z on the monitor 6. Consequently, in accordance with points given in the current evaluation period, the second sound effect is output, and an image indicating the points and the above image such as "Amazing", "Great", or the like are displayed on the monitor 6. The second effect image corresponding to the given points is also displayed.

If the current evaluation period elapses without executing the process of step S123, at the time point when the evaluation period elapses, a sound effect and an image (an image such as "0 points" or "Bad") indicating that the push-in operation is not performed are output. In this case, the points Z to be given in the current evaluation period are "0", and are not added to the point data.

Next, in step S133, the processor 81 sets the push-in detection flag to OFF.

The description of the push/pull operation evaluation process in FIG. 27 ends. A case where an instruction is given to perform the pull operation in the current evaluation period is similar to the above, and therefore is not described. In a case where an instruction is given to perform the pull operation in the current evaluation period, "push-in" is read as "pull" in the above description.

(Twist Operation Evaluation Process)

Figure 28:
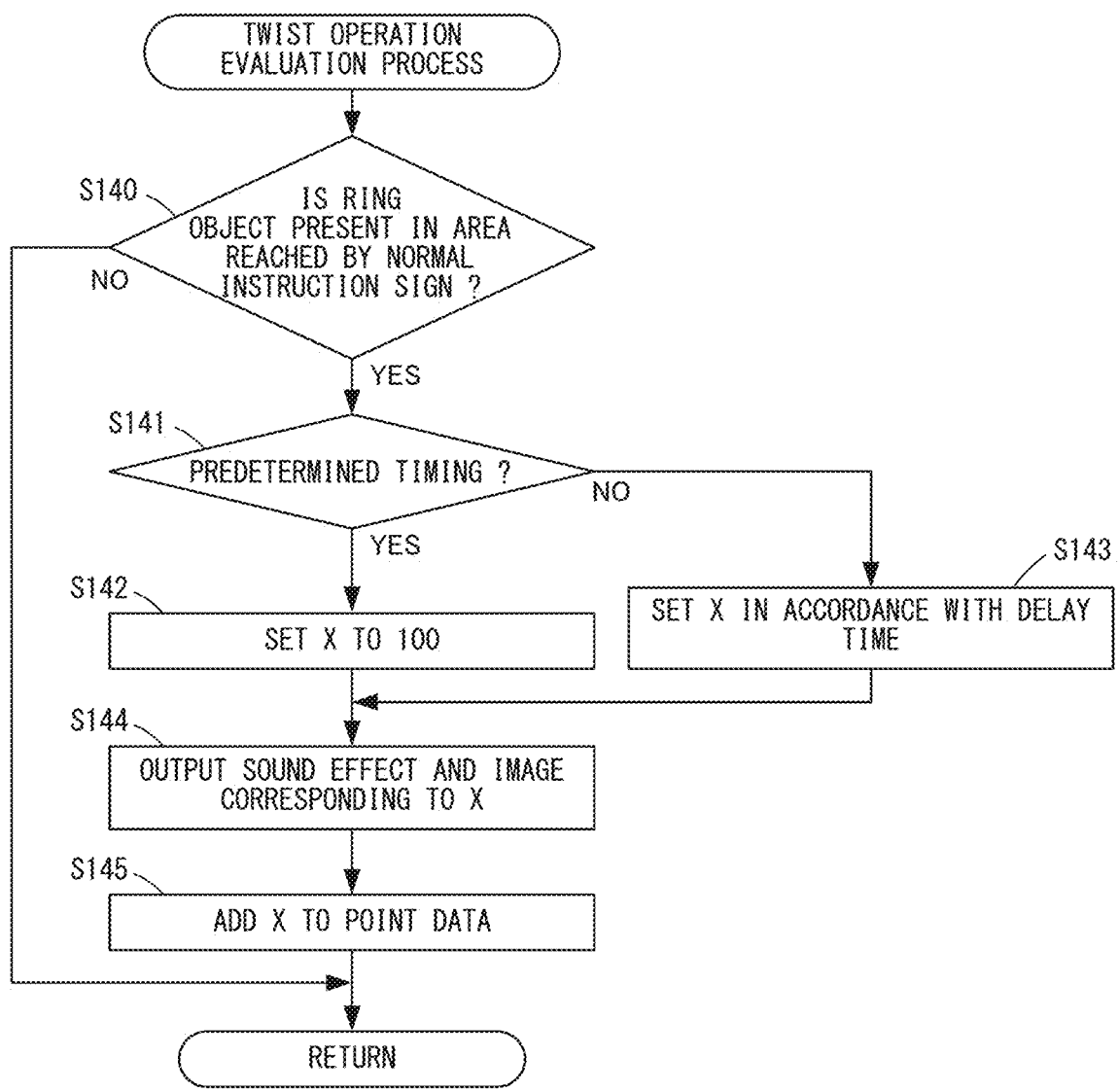
FIG. 28 is an example non-limiting flow chart showing an example of a twist operation evaluation process in step S114 in FIG. 26.

Next, the details of the twist operation evaluation process in step S114 in FIG. 26 are described. FIG. 28 is a flow chart showing an example of the twist operation evaluation process in step S114 in FIG. 26.

The twist operation evaluation process in FIG. 28 is a process for, in a case where an instruction is given to perform the twist operation without involving the deformation of the ring controller (or the operation of bringing the ring controller into the reference orientation), evaluating the operation, and is a process performed in a case where the normal instruction sign 72 reaches the determination area.

In step S140, the processor 81 determines whether or not the ring object is present in the area reached by the normal instruction sign 72. For example, in the current evaluation period, if the normal instruction sign 72 reaches the left area 70L in the upper area, the processor 81 determines whether or not the ring object 71 is currently present in the left area 70L in the upper area. If the ring object is present in the area reached by the normal instruction sign 72 (step S140: YES), the processor 81 executes the process of step S141. If, on the other hand, the ring object is not present in the area reached by the normal instruction sign 72 (step S140: NO), the processor 81 ends the processing in FIG. 28, and the processing returns to FIG. 26.

In step S141, based on the time elapsed after the reproduction of the music is started and the timing data, the processor 81 determines whether or not the current time is a predetermined timing. Specifically, the processor 81 determines whether or not the current time is in the period α from a time point (t7, t8, t9, or the like) determined in advance.

If the current time is the predetermined timing (step S141: YES), next, the processor 81 executes the process of step S142. If, on the other hand, the current time is not the predetermined timing (step S141: NO), i.e., if the current time is in the period β behind the predetermined timing (the period α), next, the processor 81 executes the process of step S143.

In step S142, the processor 81 sets the points X based on the timing to "100".

On the other hand, in step S143, in accordance with the delay time, the processor 81 sets the points X based on the timing. Specifically, in accordance with the time after the period α elapses, the processor 81 linearly decreases X.

Next, in step S144, the processor 81 outputs a sound effect and an image corresponding to the value of X. Consequently, a sound effect is output, and an image indicating the points and the above image such as "Amazing", "Great", or the like are also displayed on the monitor 6. An effect image is also displayed.

Then, in step S145, the processor 81 adds the points X to the point data and stores the point data in the DRAM 85. The description of the twist operation evaluation process in FIG. 28 ends.

It should be noted that the processes shown in the above flow charts are merely illustrative, and the order, the contents, and the like of the processes may be appropriately changed.

As described above, in the rhythm game according to the exemplary embodiment, an input of the user is provided by applying a force to the ring controller and deforming the ring controller. At a predetermined timing (T1, T2, T3, . . . ) determined corresponding to music, the input of the user is evaluated. The same evaluation is given in a case where the ring controller deforms at the predetermined timing, and a case where the ring controller deforms from a time before the predetermined timing to the predetermined timing.

Specifically, at the predetermined timing, in the state where the ring controller deforms, "100 points" are given as points based on the timing. For example, at the predetermined timing, if the state where the ring controller does not deform changes to the state where the ring controller deforms, "100 points" are given as the points based on the timing, (see FIG. 17A). Even if the ring controller starts to deform at a first time point before the predetermined timing, and then, the ring controller continues to deform until a second time point (e.g., t1) corresponding to the predetermined timing, "100 points" are given as the points based on the timing (see FIG. 17C). That is, the same points are given in a case where the state where the ring controller does not deform changes to the state where the ring controller deforms at the predetermined timing, and a case where the ring controller deforms at the predetermined timing.

If, on the other hand, the ring controller starts to deforms after the predetermined timing (e.g., td1), an input of the user is evaluated against the user (see FIG. 18A). Specifically, if the ring controller deforms after the predetermined timing, points are deducted from the points based on the timing in accordance with the delay time.

As described above, even if the ring controller deforms from a time before the predetermined timing, an input of the user is evaluated in favor of the user without deducting points, whereby it is possible to provide an input by deforming a ring controller in a rhythm game. In a case where an input is provided by deforming the ring controller, the timing when the user applies a force to the ring controller and the timing when the input is detected may be shifted from each other. However, even if the ring controller deforms from a time before the predetermined timing, high points are given without deducting points, whereby it is possible to use a ring controller in a rhythm game.

At the predetermined timing, the same evaluation may be given in (1) a case where the ring controller deforms at a first timing, and the deformation continues also at a second timing after the first timing, and (2) a case where the ring controller deforms at a first timing, the ring controller returns to a steady state (including the state where the ring controller does not deform at all, and the state where the deformation amount is so small that the ring controller can be regarded as not deforming (i.e., the state where the deformation amount of the ring controller has a small value that does not exceed a threshold)) after the first timing, and the ring controller further deforms again at a second timing after that. That is, the timing when an evaluation is made (the period T1 in FIG. 17A) may include the first timing and the second timing, and the same points may be given in both a case where the ring controller continues to be deformed from the first timing to the second timing, and a case where the ring controller deforms at the first timing, then returns to a steady state, and further deforms again at the second timing after that. Thus, for example, in a case where only the push-in instruction sign appears multiple times from the beginning to the end of music, and even if the ring controller continues to be pushed in from the beginning to the end of the music, points are added at each evaluation timing, and highest points can be obtained.

In the above exemplary embodiment, an input of the user at the predetermined timing is evaluated in two steps. Specifically, based on a first determination for determining whether or not the ring controller deforms at the predetermined timing, and a second determination based on the deformation amount of the ring controller, an input of the user at the predetermined timing is evaluated. Consequently, it is possible to evaluate an input of the user based not only on the timing of the deformation of the ring controller but also on the deformation amount of the ring controller.

The first determination for determining whether or not the ring controller deforms at the predetermined timing is made, and if it is determined that the ring controller deforms, the second determination based on the deformation amount is made after a predetermined time (e.g., 5 frame times) lapses from the time point of the first determination. In the second determination, based on the maximum value of the deformation amount in a predetermined period determined based on the time point when it is determined that the ring controller deforms (e.g., 5 frame times before and after the time point), an evaluation is made. Specifically, in the first determination, if it is determined that the ring controller deforms at the predetermined timing, a first evaluation value (the points X based on the timing) is set to a predetermined value (100 points). If the ring controller deforms after the predetermined timing, the first evaluation value is set to a value (e.g., 80 points to 10 points) lower than the predetermined value. If the ring controller deforms at the predetermined timing, or if the ring controller deforms after the predetermined timing, based on the deformation amount, a second evaluation value (the points Y based on the deformation amount) is set. Then, based on the first evaluation value and the second evaluation value, an input of the user is evaluated.

Consequently, it is possible to evaluate an input of the user based on the timing of the input and also evaluate the input of the user based on the deformation amount. Thus, it is possible to perform a rhythm game incorporating an exercise using a ring controller. Points are calculated based on the deformation amount in a predetermined period based on the time point when it is determined that the ring controller deforms, whereby, even if the deformation amount increases or decreases, it is possible to properly evaluate an input of the user. For example, even if the deformation amount increases from the time point when it is determined that the ring controller deforms, points can be calculated based on the deformation amount after the increase. Thus, even if the timing when the user applies a force is somewhat delayed, it is possible to properly evaluate an input of the user.

In the above exemplary embodiment, at the time point when the deformation of the ring controller is detected, the first sound effect and an image are output, and when a predetermined time (e.g., 5 frame times) elapses after the time point, the second sound effect and an image based on the points Z are output. Consequently, it is possible to output the first sound effect and the image in time for an input of the user, and also output an appropriate second sound effect and an image on which the evaluation of the input of the user is reflected.

In the above exemplary embodiment, in a case where the normal instruction sign 72 is displayed, a determination regarding an input of the user is made at a first timing (e.g., the timing T7). In a case where the push-in instruction sign 73 or the pull instruction sign 74 is displayed, a determination regarding an input of the user is made at a second timing (e.g., the timing T1). In a case where the normal instruction sign 72 is displayed, control is performed so that the normal instruction sign 72 reaches any of the determination areas at the first timing. In a case where the push-in instruction sign 73 or the pull instruction sign 74 is displayed, control is performed so that the push-in instruction sign 73 or the pull instruction sign 74 reaches any of the determination areas at a third timing before the second timing (e.g., a time point 2 frame times before the timing T1).

As described above, in a case where the push-in instruction sign 73 or the pull instruction sign 74 is displayed, the push-in instruction sign 73 or the pull instruction sign 74 is caused to reach the determination area before the determination timing when the determination regarding the input of the user is made arrives. Consequently, even in a case where an input is provided by deforming the ring controller, it is possible to prevent the timing when the input is detected from being delayed. Thus, it is possible to provide an input at a timing intended by the user.

In the above exemplary embodiment, the instruction sign is moved in the near direction from a position in the depth direction of the screen. Consequently, even if the determination timing and the timing when the instruction sign reaches any of the determination areas are shifted from each other as described above, it is possible to make it difficult for the user to recognize the shift. Thus, it is possible to obtain an image without an uncomfortable feeling.

In the above exemplary embodiment, the instruction sign is moved to any of three determination areas arranged in the left-right direction of the screen, and in accordance with the orientation of the ring controller, any of the three determination areas is specified. Then, if the instruction sign is present in the specified determination area, and the ring controller deforms, points are given. Consequently, it is possible to provide an input by deforming the ring controller and changing the orientation of the ring controller. Thus, it is possible to bring diversity to a rhythm game.

In the above exemplary embodiment, in a case where the continuous push-in instruction sign 75 or the continuous pull instruction sign is displayed in any of the determination areas, and if the ring object 71 is located in the same area as the instruction sign, and the ring controller continues to deform, and even if the orientation of the ring controller changes, the position of the ring object 71 is fixed. Consequently, when the push-in operation or the pull operation continues to be performed on the ring controller, and even if the orientation of the ring controller changes unintentionally, it is possible to fix the position of the ring object 71. Thus, it is possible to prevent the movement of the ring object 71 unintended by the user.

In the above exemplary embodiment, the instruction sign is moved to a first determination area (the upper area) or a second determination area (the lower area), the motion of the user's leg is detected by the leg controller, and the first determination area or the second determination area is indicated in accordance with the motion of the user's leg. Then, if the instruction sign is present in the determination area indicated in accordance with the motion of the user's leg, points are given. Consequently, it is possible to cause the user to do not only an exercise for deforming the ring controller with their hands, but also an exercise using their legs.

(Variations)

While the game according to the exemplary embodiment has been described above, the exemplary embodiment is merely an example and may be modified as follows, for example.

For example, in the above exemplary embodiment, the instruction sign is moved in the virtual space, and an image of the virtual space is generated based on the virtual camera, thereby displaying the state where the instruction sign moves in the near direction from the depth direction of the screen. In another exemplary embodiment, the state where the instruction sign moves in the near direction from the depth direction of the screen may be displayed without placing the instruction sign in the virtual space. For example, a moving image in which the instruction sign simply moves in the near direction from the depth direction of the screen may be prepared, and the moving image may be reproduced, thereby displaying the state where the instruction sign moves.

In the above exemplary embodiment, at a predetermined timing (T1, T2, T3, or the like) having a certain period, it is determined whether or not the ring controller deforms. In another exemplary embodiment, the predetermined timing may be a time point (a moment) instead of a period. That is, at a plurality of time points set in advance in accordance with music, it may be determined whether or not the ring controller deforms.

In the above exemplary embodiment, based on an output from the strain gauge provided in the ring controller, the deformation and the deformation amount of the ring controller are detected. Alternatively, the deformation and the deformation amount of the ring controller may be detected by another method. For example, an image of the ring controller may be acquired using a camera (an image sensor) placed around the ring controller, and the deformation and the deformation amount of the ring controller may be detected from the acquired image of the ring controller. The deformation and the deformation amount of the ring controller may be detected using any other sensor.

In the above exemplary embodiment, the instruction sign is moved in the near direction from the depth direction of the screen. In another exemplary embodiment, the instruction sign may be moved two-dimensionally in the left-right direction or the up-down direction of the screen.

In the above exemplary embodiment, the instruction sign is moved along three paths in the left-right direction and caused to reach any of three areas on the screen. In another exemplary embodiment, the number of movement paths of (the number of areas to be reached by) the instruction sign is not limited to this, and may be one, two, or four or more, for example. Similarly, the number of paths in the up-down direction is not limited to two as in the above exemplary embodiment, either, and may be any number.

For example, in a case where there are five movement paths of the instruction sign, and five areas to be reached by the instruction sign are arranged in the left-right direction, the ring object 71 is moved to any of the five areas in accordance with the twist amount of the ring controller. For example, if the twist amount of the ring controller is zero, the ring object 71 is located at the center. If the ring controller is rotated clockwise by a first angle, the ring object 71 may be moved to the second area from the rightmost area. If the ring controller is rotated clockwise by a second angle greater than the first angle, the ring object 71 may be moved to the rightmost area. If the ring controller is rotated counterclockwise by the first angle, the ring object 71 may be moved to the second area from the leftmost area. If the ring controller is rotated counterclockwise by the second angle greater than the first angle, the ring object 71 may be moved to the leftmost area.

In the above exemplary embodiment, the ring object 71 is displayed on the screen, and any of the plurality of determination areas is specified using the ring object 71, and if an instruction sign is present in the specified area, points are given. In another exemplary embodiment, any of the plurality of determination areas may be specified in accordance with the orientation of the ring controller without displaying the ring object 71 on the screen. The determination area may be specified not only in accordance with the orientation of the ring controller, but also in accordance with any other input. For example, the determination area may be specified by a button operation on the ring controller (the right controller 4). The determination area may be specified by providing an input to the leg controller (the left controller 3).

The push-in operation may be performed by pressing the ring controller against the abdominal area and deforming the ring controller, instead of holding the ring controller with both hands. An instruction sign for giving an instruction to perform the push-in operation using the abdominal area may be prepared in addition to (or instead of) the above push-in instruction sign 73.

In the above exemplary embodiment, an instruction sign is displayed to present the timing of an input using the ring controller to the user. In another exemplary embodiment, the timing of an input may be presented (indicated) to the user not only by an image, but also by a vibration. The timing of an input may be presented (indicated) to the user by a sound. Music may not necessarily need to be output. For example, the timing of an input may be presented (indicated) to the user by the display of an instruction sign alone.

The configuration of the game system 1 according to the above exemplary embodiment is merely an example. The above game may be performed in any other configuration. For example, in another exemplary embodiment, any input apparatus may be used so long as the input apparatus deforms by the user applying a force to the input apparatus. For example, the ring controller may have any shape such as a rod-like shape, an elliptical shape, an L-shape, or the like, instead of the circular shape.

Further, the above game system 1 may include a plurality of apparatuses connected together via a network (a WAN, the Internet, or the like). Further, instead of the main body apparatus 2, any information processing apparatus (e.g., a personal computer, a smartphone, a tablet terminal, a server, or the like) may be used, and an information processing system including this information processing apparatus may be configured.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for providing a user with a rhythm game where a plurality of timings for evaluating a user input are set, the game system comprising:
    an input apparatus including a member, at least a part of which elastically deforms by the user applying a force to the input apparatus;
    a sensor configured to provide an output corresponding to deformation of the input apparatus; and
    at least one processor, wherein
    the at least one processor is configured to:
    acquire, as a user input, information based on the output of the sensor;
    execute the rhythm game;
    during the execution of the rhythm game, evaluate the user input based on a first determination for determining whether or not the input apparatus deforms at any of the timings and a second determination based on a deformation amount of the input apparatus; and
    in the first determination, give the same evaluation to the user input in a case where the input apparatus deforms at any of the timings, and a case where the input apparatus deforms from a time before the timing to the timing.

2. The game system according to claim 1, wherein
    the at least one processor is configured to evaluate the user input related to the deformation more against the user in a case where the input apparatus deforms after the timing, than in a case where the input apparatus deforms before the timing.

3. The game system according to claim 1, wherein
    at the timing, the at least one processor is configured to give the same evaluation to the user input in (a) a case where the input apparatus deforms at a first timing, and the deformation continues also at a time point of a second timing after the first timing, and (b) a case where the input apparatus deforms at the first timing, then, the input apparatus returns to a steady state, and the input apparatus deforms again at the second timing.

4. The game system according to claim 1, wherein
    the at least one processor is configured to:
    if it is determined in the first determination that the input apparatus deforms, make the second determination after a certain time elapses from a time point when it is determined that the input apparatus deforms; and
    evaluate the user input based on the deformation amount of the input apparatus in a certain period determined based on a time point when it is determined in the second determination that the input apparatus deforms.

5. The game system according to claim 1, wherein
    the at least one processor is configured to:
    output a first sound effect based on a result of the first determination; and
    output a second sound effect based on a result of the second determination.

6. The game system according to claim 1, wherein
    the at least one processor is further configured to display on a display apparatus an instruction sign for presenting any of the timings to the user.

7. The game system according to claim 6, wherein
the at least one processor is configured to display the instruction sign to move in a near direction from a position in a depth direction of a screen of the display apparatus.

8. The game system according to claim 6, wherein
the at least one processor is configured to move the instruction sign from an initial position to one of three or more determination areas, and
the at least one processor is further configured to:
detect an orientation of the input apparatus;
in accordance with the orientation of the input apparatus, specify one of the three or more determination areas; and
if the instruction sign is present in the specified determination area, and the input apparatus deforms at any of the timings, evaluate the user input in favor of the user.

9. The game system according to claim 8, wherein
if the determination area where the instruction sign is present is specified once at the timing, the determination area continues to be specified regardless of the orientation of the input apparatus until the timing elapses.

10. The game system according to claim 1, wherein each of the timings is a predetermined timing.

11. The game system according to claim 1, wherein the first determination comprises setting a first evaluation value based on whether or not the input apparatus deforms at any of the timings,
wherein the second determination comprises setting a second evaluation value based on the deformation amount of the input apparatus, and
wherein the at least one processor is configured to evaluate the user input based on the first evaluation value and the second evaluation value.

12. The game system according to claim 1, wherein the second determination is performed at any of the timings.

13. The game system according to claim 1, wherein each of the timings comprises an elapsed period of time.

14. A non-transitory computer-readable storage medium having stored therein an information processing program executed by a computer of an information processing apparatus for providing a user with a rhythm game where a plurality of timings for evaluating a user input are set, the information processing program causing the computer to:
acquire, as a user input, information based on an output corresponding to deformation of an input apparatus, at least a part of which elastically deforms by the user applying a force to the input apparatus;
execute the rhythm game;
during the execution of the rhythm game, evaluate the user input based on a first determination for determining whether or not the input apparatus deforms at any of the timings and a second determination based on a deformation amount of the input apparatus; and
in the first determination, give the same evaluation to the user input in a case where the input apparatus deforms at any of the timings, and a case where the input apparatus deforms from a time before the timing to the timing.

15. An information processing apparatus including at least one processor for providing a user with a rhythm game where a plurality of timings for evaluating a user input are set, wherein
the at least one processor is configured to:
acquire, as a user input, information based on an output corresponding to deformation of an input apparatus, at least a part of which elastically deforms by the user applying a force to the input apparatus;
execute the rhythm game;
during the execution of the rhythm game, evaluate the user input based on a first determination for determining whether or not the input apparatus deforms at any of the timings and a second determination based on a deformation amount of the input apparatus; and
in the first determination, give the same evaluation to the user input in a case where the input apparatus deforms at any of the timings, and a case where the input apparatus deforms from a time before the timing to the timing.

16. An information processing method executed by an information processing system for providing a user with a rhythm game where a plurality of timings for evaluating a user input are set, the information processing method comprising:
acquiring, as a user input, information based on an output corresponding to deformation of an input apparatus, at least a part of which elastically deforms by the user applying a force to the input apparatus;
executing the rhythm game;
during the execution of the rhythm game, evaluating the user input based on a first determination for determining whether or not the input apparatus deforms at any of the timings and a second determination based on a deformation amount of the input apparatus; and
in the first determination, giving the same evaluation to the user input in a case where the input apparatus deforms at any of the timings, and a case where the input apparatus deforms from a time before the timing to the timing.

* * * * *